United States Patent [19]
Vasel et al.

[11] Patent Number: 5,965,839
[45] Date of Patent: Oct. 12, 1999

[54] NON-LETHAL PROJECTILE FOR DELIVERING AN INHIBITING SUBSTANCE TO A LIVING TARGET

[75] Inventors: Edward J. Vasel; Scott C. Nunan; Gregory A. Niederhaus, all of San Diego; Peter G. Coakley, Cardiff, all of Calif.

[73] Assignee: Jaycor, San Diego, Calif.

[21] Appl. No.: 08/751,709

[22] Filed: Nov. 18, 1996

[51] Int. Cl.⁶ ................................................. F42B 12/46
[52] U.S. Cl. ........................ 102/502; 102/367; 102/370; 102/444; 102/529; 473/577
[58] Field of Search ................ 102/367, 370, 102/444, 502, 513, 395, 498, 529, 512; 473/577

[56] References Cited

U.S. PATENT DOCUMENTS

| | | | |
|---|---|---|---|
| 1,517,554 | 12/1924 | Fulcher | 102/370 |
| 3,419,274 | 12/1968 | Tabor | 102/517 |
| 3,650,213 | 3/1972 | Abbott et al. | 102/444 |
| 3,707,793 | 1/1973 | Holton, II | 42/1 G |
| 3,765,116 | 10/1973 | Zaid | 42/89 |
| 3,791,303 | 2/1974 | Sweeney et al. | 102/502 |
| 3,865,038 | 2/1975 | Barr | 102/502 |
| 3,921,614 | 11/1975 | Fogelgren | 124/30 R |
| 4,153,927 | 5/1979 | Owens | 362/99 |
| 4,352,316 | 10/1982 | Medlin | 89/36 A |
| 4,560,168 | 12/1985 | Aoyama | 273/232 |
| 4,686,905 | 8/1987 | Szabo | 102/444 |
| 4,979,747 | 12/1990 | Jonkouski | 273/232 |
| 5,035,183 | 7/1991 | Luxton | 102/502 |
| 5,078,117 | 1/1992 | Cover | 124/71 |
| 5,217,708 | 6/1993 | Pinkney | 424/45 |
| 5,254,379 | 10/1993 | Kotsiopoulos et al. | 428/35.7 |
| 5,353,712 | 10/1994 | Olson | 102/502 |
| 5,361,700 | 11/1994 | Carbone | 102/439 |
| 5,402,729 | 4/1995 | Richert | 102/502 |
| 5,565,649 | 10/1996 | Tougeron et al. | 102/502 |
| 5,620,704 | 4/1997 | Cade et al. | 424/456 |
| 5,639,526 | 6/1997 | Kotsiopoulos et al. | 102/502 |
| 5,640,945 | 6/1997 | Slonaker et al. | 124/56 |
| 5,671,559 | 9/1997 | Ludaesher et al. | 42/1.08 |

FOREIGN PATENT DOCUMENTS

| | | | |
|---|---|---|---|
| 4321041 | 1/1995 | Germany | 102/502 |
| WO94/28371 | 12/1994 | WIPO | 102/502 |

*Primary Examiner*—Harold J. Tudor
*Attorney, Agent, or Firm*—Fitch, Even, Tabin & Flannery

[57] ABSTRACT

A power device includes at least two power conversion circuits respectively having at least one of switching elements, at least one of which switching elements in these conversion circuits being used in common as an element constituting the at least two different power conversion circuits, a control device providing at least a period in which at least one of currents flowing from at least one of the different power conversion circuits to the commonly used switching element has a polarity inverse to at least the other one of the currents flowing from at least the other one of the power conversion circuits, so as to cancel each other, and a unit for detecting the state of the respective conversion circuits. The operation of the switching elements is thereby made modifiable in accordance with a lowering in the resistance of a load of the device, and the withstand voltage of the elements can be prevented effectively from rising even upon any fluctuation in the load.

11 Claims, 3 Drawing Sheets

NON-LETHAL PROJECTILE FOR DELIVERING AN INHIBITING SUBSTANCE TO A LIVING TARGET

BACKGROUND OF THE INVENTION

This invention relates to a power device in which a plurality of switching circuits for power conversion employ in common a switching element.

DESCRIPTION OF RELATED ART

Various types of the power devices of this kind have been suggested, an example of which is disclosed in U.S. Pat. No. 4,949,016 wherein an arrangement is made to reduce a distortion in input current waveform while applying to a load an AC voltage by means of a combination of a boost converter and an inverter.

Further, in U.S. Pat. No. 5,063,490, there has been disclosed an arrangement of a boost converter and a low frequency inverter, wherein the switching elements in both of the boost converter and the lower frequency inverter are used in common, so that required number of the switching elements can be reduced and a low frequency square wave output can be applied to a laod.

In addition to U.S. Pat. No. 5,063,490, further, WO98/10509 discloses an arrangement for reducing any loss in the switching elements.

For easier appreciation of the present invention, references shall be made in the followings to the prior art with reference to accompanying drawings.

In FIG. 1, a circuit arrangement of a well known power device is shown, in which a series circuit of first and second field effect transistors Q1 and Q2, a series circuit of third and fourth field effect transistors Q3 and Q4 and a series circuit of two rectifying elements D5 and D6 are connected in parallel to a capacitor EC, a series circuit of a power source AC and first inductor L1 is connected between a node of the first and second field effect transistors Q1 and Q2 and a node of the two rectifying elements D5 and D6, and a series circuit of a load circuit L and second inductor L2 is connected between the node of the first and second field effect transistors Q1 and Q2 and a node of the third and fourth field effect transistors Q3 and Q4. An end of the power source AC is connected to coincide with the node between the first and second field effect transistors Q1 and Q2, and an end of the load circuit L is connected to coincide also with the same node between the first and second field effect transistors Q1 and Q2.

The respective field effect transistors Q1 through Q4 are driven for switching operation as described in the followings by ON and OFF signals provided from a control means CNT. That is, when the polarity of the source AC is negative on the side of the node between the first and second transistors Q1 and Q2 as shown in FIGS. 2a–2c, first, the operation occurs in the sequence of a period in which the second and third transistors Q2 and Q3 are made ON (see FIG. 2a), a period in which the first and third transistors Q1 and Q3 are made ON (see FIG. 2b), and a period in which the first to fourth transistors Q1–Q4 are made OFF (see FIG. 2c), whereas, when the polarity of the source AC is positive on the side of the node between the first and second transistors Q1 and Q2 as shown in FIGS. 3a–3c, next, the operation occurs in the sequence of a period in which the first and fourth transistors Q1 and Q4 are made ON (see FIG. 3a), a period in which the second and fourth transistors Q2 and Q4 are made ON, and a period in which the first through fourth transistors Q1–Q4 are made OFF (see FIG. 3c).

Such power device as in the above is constituted by a first power conversion circuit forming a boost converter and a second power conversion circuit forming a buck converter, and the first and second field effect transistors Q1 and Q2 are used in common as part of the first and second power conversion circuits. The operation in the state when the polarity of the source AC is negative on the side of the node of the first and second transistors Q1 and Q2 such as shown in FIGS. 2a–2c shall be described with respect to the first power conversion circuit forming the boost converter and the second power conversion circuit forming the buck converter.

Referring initially to the first power conversion circuit forming the boost converter, the period in which the first and third field effect transistors Q1 and Q3 are made ON (FIG. 2b) causes an energy charged in the inductor L1, and the period in which the first through fourth field effect transistors Q1–Q4 are made OFF (FIG. 2c) as well as the period in which the second and third transistors Q2 and Q3 are made ON (FIG. 2a) cause the energy stored in the first inductor L1 discharged.

Referring next to the second power conversion circuit forming the buck converter, the period in which the second and third transistors Q2 and Q3 are made ON (FIG. 2a) causes an energy charged in the second inductor L2, whereas the period in which the first and third transistors Q1 and Q3 are made ON (FIG. 2b) as well as the period in which the first through fourth transistors Q1–Q4 are made OFF (FIG. 2c) cause the energy stored in the second inductor L2 discharged.

Describing the above with an attention paid to the loop of current, the period in which the second and third transistors Q2 and Q3 are made ON (FIG. 2a) is a term (which shall be referred to as T1) in which a state where a current of the first power conversion circuit CNV1 forms a closed loop including the first inductor L1, first rectifying element D5, capacitor EC, second transistor Q2 and power source AC as well as a state where a current of the second power conversion circuit CNV2 forms a closed loop including the capacitor EC, third transistor Q3, second inductor L2, load circuit L and second transistor Q2 are simultaneously satisfied. Further, the period in which the first and third transistors Q1 and Q3 are made ON (FIG. 2b) is a term (which shall be referred to as T2) in which a state where the current of the first power conversion circuit CNV1 forms a closed loop including the source AC, first inductor L1, first rectifying element D5 and first transistor Q1 as well as a state where the current of the second power conversion circuit CNV2 forms a closed loop including the second inductor L2, load circuit L and first and third transistors Q1 and Q3 are simultaneously satisfied. Still further, the period in which the first through fourth transistors Q1–Q4 are all turned OFF (FIG. 2c) is a term (which shall be referred to as T3) in which a state where the current of the first power conversion circuit CNV1 forms a closed loop including the first inductor L1, first rectifying element D5, capacitor EC, second transistor Q2 and source AC as well as a state where the current of the second power conversion circuit CNV2 forms a closed loop including the second inductor L2, load circuit L, second transistor Q2 and fourth transistor Q4 are simultaneously satisfied.

Since, as will be clear from the above description, an input current to this power device can be controlled mainly in the term T2, it will be possible to control to some extent an input power by adjusting the length of the term T2 as shown by dotted lines in FIGS. 4a and 4b, wherein FIG. 4a showing a period in which the one end of the source AC is at the positive polarity and FIG. 4b showing a period in which the one end of the source AC is at the negative polarity. That is, it is enabled to keep the voltage across the capacitor EC at a proper value by adjusting the term T2.

The operation in the event of the inverse polarity of the source AC has been shown also in FIGS. 3a–3c, and current and signal waveforms at respective parts in the device are shown in FIG. 5, in which there are shown a current IL1 flowing to the first inductor L1, a current IL2 flowing to the second inductor L2, a difference IL2–IL1 of both currents to the inductors L2 and L1, a current IQ1 flowing to the first field effect transistor Q1, a current IQ2 flowing to the second transistor Q2, a current IQ3 flowing to the third transistor Q3, a current IQ4 flowing to the fourth transistor Q4, and driving signals VQ1GS–VQ4GS respectively supplied across the gate and source electrodes of the respective first through fourth transistors Q1–Q4. FIG. 5 shows the waveforms for one switching cycle, in which a term t0–t1 corresponds to the term T1, a term t1–t2 corresponds to the term T2, and a term t2–t3 (=t0) corresponds to the term T3.

It is assumed in the foregoing inverter circuit that a load impedance has been remarkably lowered (which shall be referred to as "upon short-circuit" in the followings). References shall be made to the current loops when the polarity of the source AC is negative on the side of the node of the first and second transistors Q1 and Q2, as shown in FIGS. 6a–6d. First, a term for which the second and third transistors Q2 and Q3 are made ON (FIG. 6a) is the term T1 in which a state where the current of the second power conversion circuit CNV2 forms a closed loop comprising the capacitor EC, third transistor Q3, second inductor L2, load circuit L and second transistor Q2 is satisfied. Next, a period in which the first and third transistors Q1 and Q3 are made ON (FIG. 6b) is the term T2 in which a state where the current of the first power conversion circuit CNV1 forms a closed loop comprising the source AC, first inductor L1, first rectifying element D5 and first transistor Q1 as well as a state where the current of the second power conversion circuit CNV2 forms a closed loop comprising the second inductor L2, load circuit L, first transistor Q1 and third transistor Q3 are simultaneously satisfied. In the period for which the first through fourth field effect transistors Q1–Q4 are all made OFF (FIG. 6c or 6d), on the other hand, there exist such two states as in the followings, depending on the relationship in magnitude between the currents flowing to the first and second inductors L1 and L2.

In an event where the absolute value of the current to the first inductor L1 is smaller than that of the current to the second inductor L2 (FIG. 6c), it occurs the term T3 in which a state where the current of the first power conversion circuit CNV1 forms a closed loop comprising the source AC, first inductor L1, first rectifying element D5 and first transistor Q1 as well as a state where the current of the second power conversion circuit CNV2 forms a closed loop comprising the second inductor L2, load circuit L, first transistor Q1, capacitor EC and fourth transistor Q4 are simultaneously satisfied. Further, when the absolute value of the current of the first inductor L1 coincides with the absolute value of the current of the second inductor L2 (FIG. 6d), the currents from the first and second power conversion circuits CNV1 and CNV2 are mutually cancelled, consequent to which the sum total of the currents flowing into the switching elements used in common will be zero, no closed loop of current through the commonly used switching elements is formed within the respective power conversion circuits in practice, and it becomes a term (which shall be referred to as T4) in which a state of forming a closed loop comprising the first inductor L1, first rectifying element D5, capacitor EC, fourth transistor Q4, second inductor L2, load circuit L and source AC is satisfied.

Describing the foregoing terms T1–T4 with reference to the first power conversion circuit forming the boost converter and the second power conversion circuit forming the buck converter, the terms T2 and T3 with reference to the first power conversion circuit are for having an energy charged in the first inductor L1, while the term T4 is for having the charged energy in the first inductor L1 discharged. With reference to the second power conversion circuit forming the buck converter, the term T1 is for charging an energy in the second inductor L2, while the terms T2–T4 are for having the charged energy in the second inductor L2 discharged.

The operation in the event where the source AC is at an inverse polarity is shown in FIGS. 7a–7d, and waveforms of the currents and signals at respective parts in FIG. 7 arrangement are shown in FIG. 8. In this case, the operation will be substantially the same as that has been referred to with reference to FIG. 5.

When the load impedance is lowered, there is shown a tendency that the power consumed at the load decreases, and the input power becomes excessive with respect to the output power. In respect of this, in the prior art arrangement so long as the same is in stationary state, the control circuit allows the input power to be decreased by shortening the term T2 (FIG. 5) relating to the input power so as to have the above tendency balanced. Upon the short-circuit, however, the term T3 is present even after termination of the shortened term T2 (FIG. 8). That is, the current of the second inductor L2 on the side of the buck converter is caused to flow through a parasitic diode of the field effect transistor Q1 or Q2 commonly used, even if the shortened term T2 has terminated and the term T3 is reached to have all switching elements turned OFF so that, as viewed from the circuit on the side of the boost converter, the commonly used transistor Q1 or Q2 is caused to operate as if the same is kept in ON state, as shown in FIG. 6c or in FIG. 7c. This state is retained until the current value of the first inductor L1 coincides with the current value of the second inductor L2.

Difference in the phenomenon upon the short-circuit from that of stationary state occurs due to that the absolute value of the current of the second inductor L2 at the time when the term T2 terminates becomes larger than the absolute value of the current of the first inductor L1 as a result of the lowering of the load impedance upon the short-circuit. Because of this, the energy-accumulating current is caused to flow into the first inductor L1 for a longer term (t1–t3) than the term T2 required by the control circuit, consequent to which the excessive input occurs. Due to the above phenomenon, there has been a problem that, as the input power becomes no more controllable with the control circuit, the voltage Vec across the capacitor EC is caused to rise over the voltage upon the stationary operation. In an event when the power device of the foregoing arrangement is applied to the discharge lamp lighting device, in particular, it is necessary to assure a required current for maintaining the discharge at starting step at which an equivalent resistance of the load circuit including the discharge lamp is lowered, and the rise in the voltage Vec across the capacitor EC becomes an obstacle.

SUMMARY OF THE INVENTION

The present invention is to solve the foregoing problems, and it is an object of the invention to provide a power device capable of allowing the switching elements to be used in common for different purposes without increasing stress on the elements nor causing the withstand voltage of the element to rise even upon fluctuation in the load.

This object is realized by means of a power device of a circuit arrangement in which a series circuit of first and second switching elements Q1 and Q2 connected to be coincident in their forward direction with each other and respectively having an inverse directional current passing element connected in parallel to the switching element, a series circuit of third and fourth switching elements Q3 and Q4 connected to be coincident in their forward direction with each other and repectively having an inverse directional current passing element connected in parallel to the switching element and a series circuit of two rectifying elements D5 and D6 are connected in parallel to a smoothing capacitor EC, a series circuit of AC power source AC and first inductor L1 is connected between a node of the two rectifying elements D5 and D6 and a node of the first and second switching elements Q1 and Q2, and a series circuit of a load circuit L and second inductor L2 is connected between the node of the first and second switching elements Q1 and Q2 and a node of the third and fourth switching elements Q3 and Q4, characterized in that means DET is provided for detecting the state of the circuit arrangement so as to modify the operation of the switching elements in response to a lowering in a load resistance.

Other objects and advantages of the present invention shall be made clear in the following description of the invention detailed with reference to preferred embodiments of the invention as shown in accompanying drawings.

BRIEF DESCRIPTION OF THE DRAWINGS

FIGS. 20 and 21 are explanatory waveform diagrams for the other operation of the circuit of FIG. 16;

FIG. 22 is a circuit diagram showing another embodiment of the power device according to the present invention;

FIGS. 23 and 24 are explanatory waveform diagrams respectively for the operation of the circuit of FIG. 22;

FIG. 25 is an explanatory diagram for the other operation of the circuit of FIG. 22;

FIG. 26 is a circuit diagram showing another embodiment of the power device according to the present invention; and FIG. 27 is an explanatory diagram for the operation of the circuit shown in FIG. 26.

While the present invention shall now be described with reference to the respective embodiments of the invention as shown in the accompanying drawings, it should be appreciated that the intention is not to limit the invention only to these embodiments shown but rather to include all alterations, modifications and equivalent arrangements possible within the scope of appended claims.

DETAILED DESCRIPTION OF THE PREFERRED EMBODIMENTS

Figure 9:
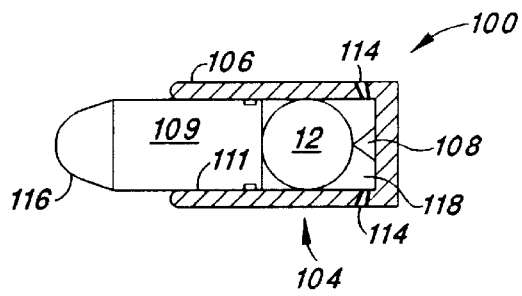
FIG. 9 is a circuit diagram showing an embodiment of the power device according to the present invention.

In FIG. 9, a preferred embodiment of the present invention is shown, in which a series circuit of first and second switching elements Q1 and Q2 connected to be coincident in their forward direction with each other and respectively having an inverse directional current passing element connected in parallel to the switching element as well as a series circuit of third and fourth switching elements Q3 and Q4 connected to be coincident in their forward direction with each other and respectively having an inverse directional current passing element connected in parallel to the switching element are connected in parallel to a capacitor EC at the same polarity. Further, a circuit in which two rectifying elements D5 and D6 are connected in series is connected in parallel to the capacitor EC to be at inverse polarity, and a series circuit of an AC power source AC and first inductor L1 is connected between a node of the two rectifying elements D5 and D6 and a node of the first and second switching elements Q1 and Q2, while a further series circuit of a load circuit L and second inductor L2 is connected between the node of the first and second switching elements Q1 and Q2 and a node of the third and fourth switching elements Q3 and Q4. The series circuit of the AC power source AC and first inductor L1 is connected on the side of the source AC to the node of the first and second switching elements Q1 and Q2, the series circuit of the load circuit L and second inductor L2 is connected on the side of the load circuit L to the same node of the first and second switching elements Q1 and Q2.

Figure 11:
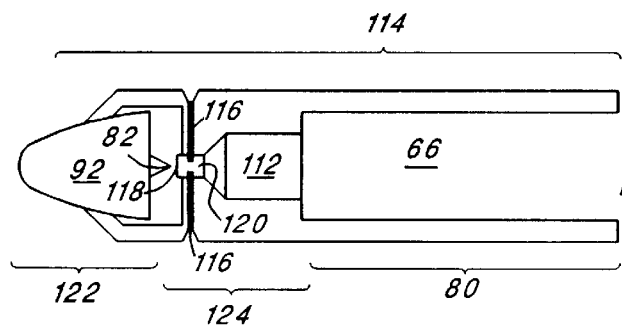
FIG. 11 is an explanatory waveform diagram for the other operation of the circuit of FIG. 9.
Figure 10:
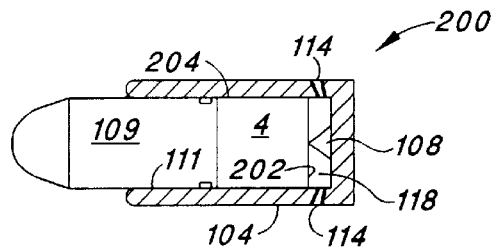
FIG. 10 is an explanatory waveform diagram for the operation of the circuit of FIG. 9.

According to the present invention, further, the power device of the foregoing circuit arrangement is provided with means for detecting the state of the circuit, so that the operation will be changed over such that, upon steady state, the switching elements are made to carry out their switching operation with such driving signals as in FIG. 10 and, upon short-circuit operation, the switching elements are made to carry out the operation with such driving signals as in FIG. 11. As shown also in FIG. 15, the arrangement may be made to have the operation sequentially changed over in response to a load impedance R.

EMBODIMENT 1

The circuit arrangement of Embodiment 1 is as shown in FIG. 9, in which the main circuit is the same in the arrangement as that in the case of the foregoing prior art. On the other hand, a control circuit CNT in the present embodiment comprises two systems of signal generating circuits OSC1 and OSC2, switching means PSW for switching the signals of these two systems, a driving circuit DRV, and a circuit state detecting means DET. In accordance with the state detected by the circuit state detecting means DET, signals of either the signal generating circuit OSC1 or OSC2 are selected by the switching means PSW, and the driving signals for the switching elements Q1–Q4 are prepared with outputs of a polarity discriminating means PDT. While not specifically shown, the polarity discriminating means PDT is providing output signals for discriminating whether the polarity of the source AC is positive or negative.

The operation in the event where the load impedance is of a value more than a predetermined and the balance of input and output powers is stable, the operation will be the same as in the foregoing prior art, as based on the output of the signal generating circuit OSC1. This shall be referred to in the followings as "steady state". The driving signals S1–S4 for the switching elements Q1–Q4 in the steady state will be as shown in FIG. 10, so that the switching operation of terms T1–T3 are carried out, under the polarity of the source AC which is negative on the side of the node of the first and second switching elements Q1 and Q2 as in the prior art. When the polarity of the source AC is positive on the side of the node of the first and second switching elements Q1 and Q2, the switching operation of terms T1'–T3' are carried out.

In an event where, on the other hand, the circuit state detecting means DET has detected the load impedance to be low and the input power to be excessive, an output of the signal generating circuit OSC2 causes an operation for avoiding an abnormal voltage rise to take place. This shall be referred to in the followings as "short-circuit operation".

The driving signals S1–S4 for the respective switching elements Q1–Q4 upon the short-circuit operation in the present embodiment will be as shown in FIG. 11.

Next, the short-circuit operation in the present embodiment shall be described. First, in the state where the polarity of the source AC on the side of the node of the first and second switching elements Q1 and Q2 is negative, the operation takes place in the sequence of a period for turning ON the second and third switching elements Q2 and Q3, a period for turning ON the second switching element Q2 only, and a period for turning OFF all the switching elements Q1–Q4, whereas, in the state of positive polarity of the source AC on the side of the node of the first and second switching elements Q1 and Q2, the operation is performed in the sequence of a period for turning ON the first and fourth switching elements Q1 and Q4, a period for turning ON the first switching element Q1 only, and a period for turning OFF all the switching elements Q1–Q4 (FIG. 11).

Figure 12:
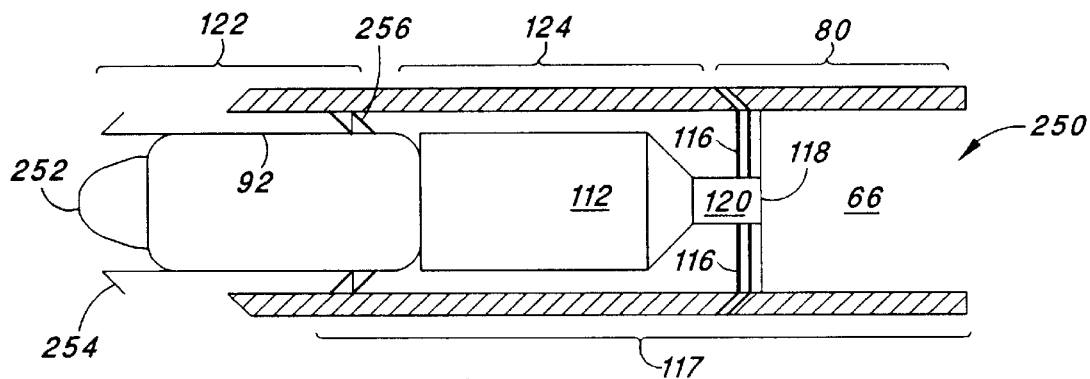
FIG. 12 is an explanatory circuit diagram for the operation in the circuit of FIG. 9.
Figure 13:
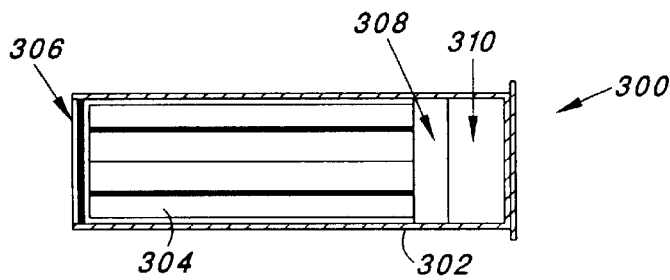
FIG. 13 is an explanatory waveform diagram for the other operation of the circuit of FIG. 9.
Figure 14:
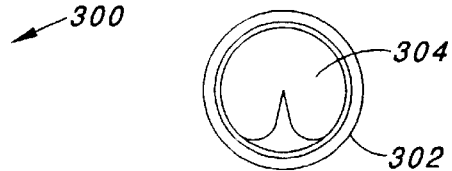
FIGS. 14 and 15 are explanatory waveform diagrams for the other operation of the circuit in FIG. 9.

In FIG. 12, transition of the operation of the switching elements and current loop upon the short-circuit operation in the present embodiment is shown, while FIG. 13 shows current and signal waveforms at respective parts in the circuit. In this case, FIGS. 12 and 13 are of the operation in the state of the negative polarity of the source AC on the side of the node of the first and second switching elements Q1 and Q2. In FIGS. 14$a$ and 14$b$, a comparison of a current waveform at the inductor L2 upon the short-circuit in the prior art with a current waveform at the inductor L2 upon the short-circuit in the present embodiment is shown, in which solid lines denote the current of the second inductor L2 and broken lines denote the current of the first inductor L1. In contrast to the current upon the short-circuit in the prior art (FIG. 14$a$), it is seen that, upon the short-circuit operation of the present embodiment (FIG. 14$b$), the current of inductor L2 at time ts2 is decreased due to the short-circuit operation, required time (ts2 to ts3) for equalization in the current value of both inductors L1 and L2 is shortened thereby, the accumulated energy amount in the inductor L1 is reduced, and the input power is reduced. Due to this, an effect of avoiding any abnormal voltage rise in the capacitor due to the excessive input power, in the event of low load impedance, is established.

EMBODIMENT 2

Figure 16:
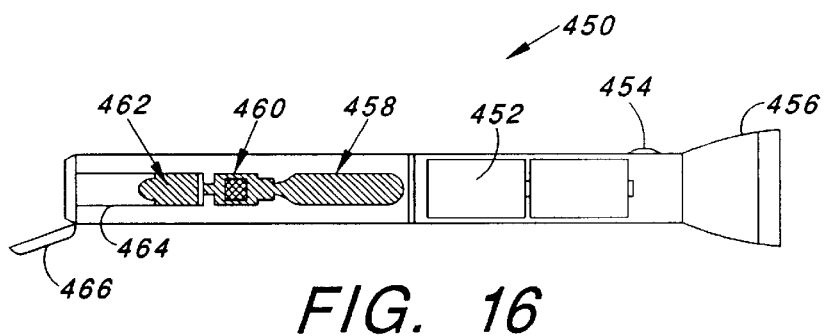
FIG. 16 is a circuit diagram showing another embodiment of the power device according to the present invention.

In FIG. 16, a circuit diagram of Embodiment 2 according to the present invention is shown, in the power device of which the series circuit of the first and second switching elements Q1 and Q2 respectively comprising a field effect transistor carrying each of parasitic diodes D11 and D12, the series circuit of the third and fourth switching elements Q3 and Q4 respectively comprising the field effect transistor carrying each of parasitic diodes D13 and D14, and a series circuit of first and second diodes D1 and D2 are connected mutually in parallel across a smoothing capacitor CO. Further, between the node of the switching elements Q1 and Q2 and the node of the switching elements Q3 and Q4, the second inductor L2 and load circuit Z are connected in series, and, between the node of the switching elements Q1 and Q2 and the node of the diodes D1 and D2, the AC power source AC and first inductor L1 are connected in series.

An oscillatory driving circuit 1 is arranged for generating signals with which the switching elements Q1–Q4 perform a switching operation upon the short-circuit operation in Embodiment 1.

Figure 17:
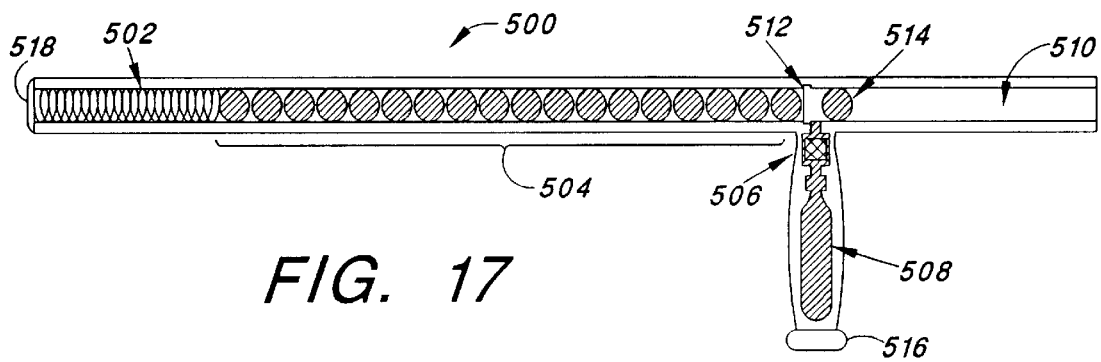
FIG. 17 is an explanatory circuit diagram for the operation of the circuit of FIG. 16.
Figures 18, 19:
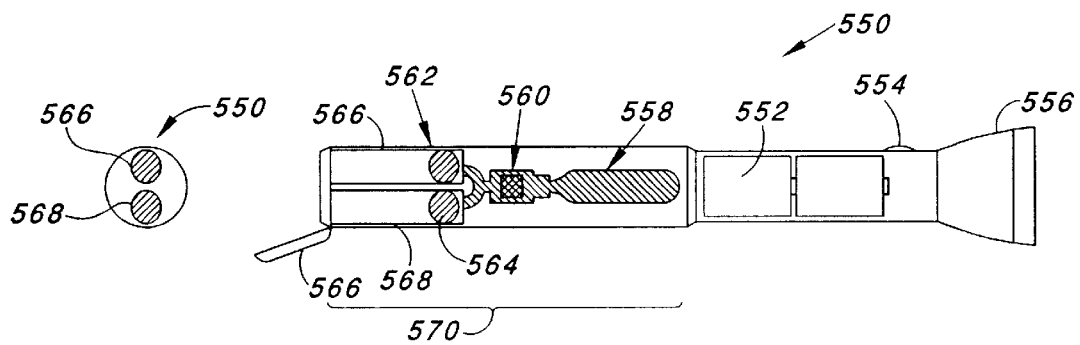
FIG. 18 is an explanatory waveform diagram for the operation of the circuit of FIG. 16.
FIG. 19 is an explanatory circuit diagram for the other operation of the circuit of FIG. 16.

A load voltage detector 2 is provided for detecting a load voltage across the load circuit Z, and a signal regulator 3 is provided for regulating the operation of the driving circuit 1 in accordance with an output signal of the load voltage detector 2. The operation and waveforms with this circuit arrangement are shown in FIGS. 17–19.

As the voltage signal from the load voltage detector 2 increases, in the present embodiment, the term T1 generated by the oscillatory driving circuit 1 is elongated while the term T2 is shortened, and the switching frequency f is made higher (to shorten the cycle), whereby, when the voltage signal from the load voltage detector 2 is low (the load impedance is low), the term T1 is shortened while the term T2 is elongated and the frequency f is lowered (the cycle is elongated), consequent to which the term T1 is made shorter than in the case where the load impedance is high whereas the term T2 is made longer. FIG. 20 shows current and signal waveforms at respective parts in the circuit in the case when the load impedance is low.

As will be clear when FIG. 20 is compared with FIG. 21 showing the similar waveforms in the event where the pulse width and frequency are not controlled, an initial value of the inductor current IL2 in the term T3 is lowered by rendering the term T1 shorter but the term T2 longer, as a result of which the period γ in the term T3 (the term corresponding to the charging period of the first power conversion circuit comprising the boost converter) is made shorter, so that the energy supplied by the source is reduced, a continuous mode in which the inductor current IL2 flows continuously can be dissolved, and an integration value of the inductor current IL2 can be reduced as compared with the prior art. As a result, it is enabled to prevent from occurring such problems that the voltage across the smoothing capacitor CO rises excessively upon the low load impedance or that any stress on the switching elements Q1–Q4 increases. It is also made possible to assure a sufficient output power even under the low load impedance, while maintaining the peak value of the inductor current IL2 at the same level as that upon the steady state in the prior art.

Further, in an arrangement provided with the load voltage detector 2 for detecting the voltage across the load circuit Z and providing the voltage signal proportional to the absolute value of the detected voltage, and with the signal regulator 3 only for controlling the oscillatory driving circuit 1 to cause the periods increased in response to increase in the voltage signal from the load voltage detector 2, the same effect as in the foregoing arrangement can be attained while not so remarkable.

EMBODIMENT 3

In this embodiment, the device is arranged as in FIG. 22, so as to be featured in change-over timing of the operation.

The commercial AC power source Ei, switching elements Q1–Q4, smoothing capacitor Ce, inductors L1 and L2, inverse and parallel current passing elements of the switching elements, and diodes D5 and D6 are employed substantially in the same connecting relationship as in the foregoing known arrangement.

On the other hand, the switching elements Q1–Q4 are controlled by means of a polarity changing circuit PC. Since the operation of the switching elements Q1–Q4 is changed over in accordance with the polarity of the AC source Ei, as has been described with reference to the prior art, the control sequence of the switching elements Q1–Q4 is changed over by the polarity changing circuit PC in accordance with the output of the polarity detector PD detecting the polarity of the source Ei.

Further, in order that the operation of the switching elements Q1–Q4 is changed over between the steady mode and the low impedance mode, during the steady state of the load circuit Z and under the low impedance of the load circuit Z, the control circuit is provided with a steady mode controlling circuit AT generating a signal of a timing corresponding to the steady mode and with a low impedance mode controlling circuit BT generating a signal of a timing corresponding to the low impedance mode, and the operation change-over is determined by an operation mode changing circuit MD which selects either one of outputs from these mode controlling circuits AT and BT. The timing of change-over by the operation mode changing circuit MD shall be described later.

In the steady mode, the term T2 is so varied as to keep the voltage across the capacitor Ce constant. That is, a voltage detecting circuit VS is provided for detecting the- voltage across the capacitor Ce, a difference between the voltage Vce across the capacitor Ce as detected by the circuit VS and a reference voltage V1 is obtained by means of an error amplifier EA, and the term T2 is controlled by varying an input voltage to the steady mode controlling circuit AT in accordance with an output of the error amplifier EA. The term T2 is to be elongated if the voltage Vce across the capacitor Ce is lower than the reference voltage V1 set at the error amplifier EA, or to be shortened if the voltage Vce is higher than reference voltage V1, and the voltage Vce across the capacitor Ce is to be kept constant with this operation. The term T2 in the low impedance mode controlling circuit BT is kept constant (the reference voltage for keeping it constant is shown by u2), while the term T1 in the steady mode controlling circuit AT and low impedance mode controlling circuit BT is kept constant in the same length (the reference voltage for keeping it constant is shown by u1). Driving sequence in the steady mode is shown in FIGS. 23a and 23b while driving sequence in short-circuit mode is shown in FIGS. 24a and 24b.

On the other hand, the operation mode changing circuit MD is controlled by an output of a comparator CP for comparing magnitude relationship between the voltage Vce across the capacitor Ce detected by the detecting circuit Vs and a comparison voltage V2 (>V1), and the mode changing circuit MD is so controlled as to select the steady mode in a period when the voltage Vce across the capacitor Ce is lower than the comparison voltage V2, or to select the low impedance mode when Vce is higher than V2. Here, the comparison voltage V2 is set higher than the reference voltage V1 for the reason that the comparison voltage V2 is a voltage for determining the change-over point between the steady mode and the low impedance mode, whereas the reference voltage V1 is for determining a reference value of the control within a range of the steady mode.

With the above arrangement, the voltage Vce across the capacitor Ce is caused to vary as shown in FIG. 25, in which the voltage Vce upon operation in the steady mode is shown by a curve ① and the voltage Vce upon the short-circuit mode is shown by a curve ②. That is, in a zone a around an impedance ZO upon rated operation of discharge lamp La in the load circuit, the voltage Vce across the capacitor Ce is kept constant (at the reference voltage V1) and, in a zone β of smaller impedance than in the zone α, the voltage Vce rises higher as the impedance becomes smaller. At this time, the term T2 does not exist.

As the voltage Vce across the capacitor Ce has reached the comparison voltage V2, the operation is changed over from the steady mode to the low impedance mode. Here, the term T1 is equal in both of the steady mode and low impedance mode, the voltage Vce across the capacitor Ce upon transition from the steady mode to the low impedance mode (=V2) is higher than the voltage attainable in the low impedance mode, and the voltage Vce across the capacitor Ce is caused to be lowered. Consequently, the voltage Vce across the capacitor Ce tends to be below the comparison voltage V2, so as to return to the steady mode again, and the voltage Vce tends to rise again. Thus, in a zone γ, the steady mode and low impedance mode are concurrently present as mixed, so that the voltage Vce across the capacitor Ce can be maintained to be adjacent to the comparison voltage V2.

Here, the capacity of the capacitor Ce is set to be sufficiently large with respect to the current flowing to the load circuit Z, so that the voltage Vce across the capacitor Ce can be prevented from being abruptly caused to vary. When in particular the term T1 is set substantially equal in both of the steady and low impedance modes, variation in the current flowing to the load circuit Z is reduced even upon change-over of the mode, because the term T1 is one for supplying the power from the capacitor Ce to the load circuit.

In a zone δ in which the impedance of the load circuit Z becomes still smaller, the voltage Vce across the capacitor Ce rises above the comparison voltage V2. As compared with a case of controlling only in the steady mode, however, abnormal rise of the voltage Vce across the capacitor Ce up to the load circuit Z of small impedance can be prevented.

Since as has been described the voltage Vce across the capacitor Ce can be prevented from rising abnormally even when the impedance of the load circuit Z is made smaller, it is enabled to employ such circuit constituents as the capacitor Ce, switching elements Q1–Q4 and so on which are relatively low in the withstanding voltage, small in size and low in costs. Further, since the voltage Vce across the capacitor Ce is maintained substantially constant upon change-over of the controlled operation of the switching elements Q1–Q4, the current to the load is not caused to remarkably vary, and even a high voltage discharge lamp included in the load circuit can be prevented from flickering off.

EMBODIMENT 4

In Embodiment 4, as shown in FIG. 26, a lighting discrimination circuit LD is provided as a load detection circuit, in contrast to the circuit arrangement of Embodiment 1, so that, to be distinct therefrom, the reference voltage of the error amplifier EZ will be changed over by means of a switch SW1 between V11 and V12 (V2>V12>V11) in accordance with lighting state of the discharge lamp La as detected by the lighting discrimination circuit LD.

Now in the present embodiment, the arrangement is made, as in the above, to change over the reference voltage in the term T2 in the steady mode in two stages of V11 and V12, so that two types of the voltage maintained in the steady mode are provided, upon which the lighting discrimination circuit LD is to disciriminate if the discharge lamp La is lighted or not lighted (loadless) on the basis of the voltage across the discharge lamp LA, such that, upon not lighted, the voltage across the discharge lamp becomes higher than that in the lighted state, and the lighted or not lighted state can be discriminated through comparison of the voltage across the lamp with any proper threshold value. Thus, the higher reference voltage V12 is selected in the not lighted state. That is, in the steady mode in the lighted state of the discharge lamp La, the operational characteristics shown by a curve ① in FIG. 27 is attained, while in the steady mode in the not lighted state, the operational characteristics shown by a curve ③ in FIG. 27 is attained, and in the low impedance mode the operational characteristics shown by a curve ② in FIG. 27 is attained. In respect of the term T1, however, the setting is so made that the characteristics will be the same in both of the stationary and low impedance modes.

According to the foregoing arrangement, the voltage Vce across the capacitor Ce can be higher upon lighting the lamp than in the case of the steady mode, so that a sufficient voltage can be applied rapidly to the load and, even when the load is the high voltage discharge lamp, the same can be reliably started.

What is claimed is:

1. A power device for providing to a load circuit an AC voltage synchronized with an AC power source, the device comprising a first series circuit of first and second switching elements connected to be coincident in their forward direction with each other and respectively having an inverse directional current passing element connected in parallel to the switching element, a second series circuit of third and fourth switching elements connected to be coincident in their forward direction and respectively having an inverse directional current passing element connected in parallel to each switching element, a third series circuit of two rectifying elements in the same direction as the inverse directional current passing elements, a smoothing capacitor to which the first, second and third series circuits are connected in parallel, a first inductor connected through the AC power source between a node of the switching elements of the first series circuit and a node of the two rectifying elements in the third series circuit, and a second inductor connected through the load circuit between the node of the switching elements in the first series circuit and a node of the switching elements in the second series circuit, wherein the device further comprises a boost converter connected to the AC power source and including at least part of the switching elements and first inductor, a buck converter connected to the smoothing capacitor and including at least part of the respective switching elements and the second inductor, a control circuit for controlling the operation of the respective switching elements to have at least one of the switching elements used in common in the boost and buck converters and to provide a period in which currents flowing through the commonly used switching element upon operation of the boost converter and upon operation of the buck converter in directions cancelling each other, and means for detecting the state of the load circuit, the control circuit receiving an output from the load state detecting means to have the operation of the switching elements varied in accordance with a lowering in a load resistance of the load circuit.

2. The power device according to claim 1 wherein the control circuit controls the operation of the switching elements to be varied so as to provide a period in which, upon a short-circuit operation in a state where the lowering in the load resistance is detected by the load state detecting means, an energy accumulated in the second inductor is discharged with such first and second closed circuits as follows formed:

(a) the first closed circuit being formed, in an event where the polarity of the AC power source on the side of the node of the first and second switching elements is negative, through the second switching element, fourth switching element, second inductor and load circuit, and (b) the second closed circuit being formed, in an event where the polarity of the AC power source of the side of the node of the first and second switching element is positive, through the first switching element, third switching element, second inductor and load circuit.

3. The power device according to claim 1 wherein the control circuit controls the operation of the switching elements to be varied, upon a short-circuit operation in a state where the lowering in the load resistance is detected by the load state detecting means, through such first and second controls as follows:

(A) the first control being performed, in an event when the polarity of the AC power source on the side of the node of the first and second switching elements is negative, in the sequence of a period in which the second and third switching elements are turned ON, a period in which the second switching element only is turned ON, and a period in which the first through fourth switching elements are all turned OFF, and (B) the second control being performed, in an event when the polarity of the AC power source on the side of the junction point of the first and second switching elements is positive, in the sequence of a period in which the first and fourth switching elements are turned ON, a period in which the first switching element only is turned ON, and a period in which the first through fourth switching elements are all turned OFF.

4. The power device according to claim 3 wherein the control circuit controls the operation of the switching elements to be varied, in steady state in a state where the lowering in the load resistance is not detected by the load state detecting means, through such third and fourth controls as follows:

(C) the third control being performed, in an event when the polarity of the AC power source on the side of the node of the first and second switching elements is negative, in the sequence of a period in which the second and third switching elements are turned ON, a period in which the first and third switching elements are turned ON, and a period in which the first to fourth switching elements are all turned OFF, and (D) the fourth control being performed, in an event when the polarity of the AC power source on the side of the node of the first and second switching elements is positive, in the sequence of a period in which the first and fourth switching elements are turned ON, a period in which the second and fourth switching elements are turned ON, and a period in which the first to fourth switching elements are all turned OFF.

5. The power device according to claim 3 wherein the control circuit performs the control in accordance with the lowering in the load resistance detected by the load state detecting means, so as to render, in the first control (A), the period in which the second and third switching elements are turned ON to be shorter, and, in the second control (B), the period in which the first and fourth switching elements are turned ON to be shorter.

6. The power device according to claim 3 wherein the control circuit performs the control in accordance with the lowering in the load resistance detected by the load state detecting means, so as to render, in the first control (A), the period in which only the second switching element is turned ON to be longer, and, in the second control (B), the period in which the first switching element is turned ON to be longer.

7. The power device according to claim 3 wherein the control circuit performs the control in accordance with the lowering in the load resistance detected by the load state detecting means, in a direction of rendering the cycle of the first control (A) to be longer, and in a direction of rendering the cycle of the second control (B) to be longer.

8. The power device according to claim 1 wherein the control circuit performs the control so as to select, upon detection by the load state detecting means of a voltage across the smoothing capacitor to be below a predetermined comparison voltage, a steady mode for carrying out such fifth control as follows for varying the operation of the switching elements at a higher frequency than that of the AC power source, or, upon detection of the voltage across the smoothing capacitor to be above the predetermined comparison voltage, a low-impedance mode for carrying out such sixth control as follows for varying the operation of the switching elements at a higher frequency than that of the AC power source:

(E) the fifth control being performed, in the event of the negative polarity of the AC power source on the side of the junction point of the first and second switching elements, in the sequence of a period in which the second and third switching elements are made ON and the first and fourth switching elements are made OFF, a period in which the first and third switching elements are made ON and the second and fourth switching elements are made OFF, and, in the event of the positive polarity, in the sequence of a period in which the first and fourth switching elements are made ON and the second and third switching elements are made OFF, and a period in which the second and fourth switching elements are made ON and the first and third switching elements are made OFF, and (F) the sixth control being performed, in the event of the negative polarity of the AC power source on the side of the junction point of the first and second switching elements, in the sequence of a period in which the second and third switching elements are made ON and the first and fourth switching elements are made OFF, and a period in which the second and fourth switching elements are made ON and the first and third switching elements are made OFF, and, in the event of the positive polarity, in the sequence of a period in which the first and fourth switching elements are made ON and the second and third switching elements are made OFF, and a period in which the first and third switching elements are made ON and the second and fourth switching elements are made OFF.

9. The power device according to claim 8 which further comprises a steady mode controlling circuit for regulating the state of the fifth control in the event where the steady mode is selected, to regulate such period as in the following in a direction of reducing any differnece of the voltage across the smoothing capacitor from a reference voltage set lower than the comparison voltage, the period being, in the event of the negative polarity of the AC power source on the side of the node of the first and second elements, one in which the first and third switching elements are made ON and the second and fourth switching elements are made OFF, and, in the event of the positive polarity, one in which the second and fourth switching elements are made ON and the first and third switching elements are made OFF.

10. The projectile of claim 9, wherein each of said plurality of dimples includes frustoconical-shaped walls and a basal portion.

11. The projectile of claim 10 wherein each of said basal poprtions are circular in shape.

* * * * *

UNITED STATES PATENT AND TRADEMARK OFFICE
CERTIFICATE OF CORRECTION

| | | |
|---|---|---|
| PATENT NO. | : 5,965,839 | Page 1 of 9 |
| DATED | : October 12, 1999 | |
| INVENTOR(S) | : Vasel et al. | |

It is certified that error appears in the above-identified patent and that said Letters Patent is hereby corrected as shown below:

Title page,
Should be deleted to appear as per attached title page.

Please delete coluns 1-14 and substitute columns 1-14 as per attached.

Signed and Sealed this

Twenty-third Day of October, 2001

*Attest:*

NICHOLAS P. GODICI
*Attesting Officer*    *Acting Director of the United States Patent and Trademark Office*

United States Patent [19]

Vasel et al.

[11] Patent Number: 5,965,839
[45] Date of Patent: Oct. 12, 1999

[54] NON-LETHAL PROJECTILE FOR DELIVERING AN INHIBITING SUBSTANCE TO A LIVING TARGET

[75] Inventors: Edward J. Vasel; Scott C. Nunan; Gregory A. Niederhaus, all of San Diego; Peter G. Coakley, Cardiff, all of Calif.

[73] Assignee: Jaycor, San Diego, Calif.

[21] Appl. No.: 08/751,709

[22] Filed: Nov. 18, 1996

[51] Int. Cl.$^6$ .................................................. F42B 12/46
[52] U.S. Cl. .......................... 102/502; 102/367; 102/370; 102/444; 102/529; 473/577
[58] Field of Search ......................... 102/367, 370, 102/444, 502, 513, 395, 498, 529, 512; 473/577

[56] References Cited

U.S. PATENT DOCUMENTS

| 1,517,554 | 12/1924 | Fulcher | 102/370 |
|---|---|---|---|
| 3,419,274 | 12/1968 | Tabor | 102/517 |
| 3,650,213 | 3/1972 | Abbott et al. | 102/444 |
| 3,707,793 | 1/1973 | Holton, II | 42/1 G |
| 3,765,116 | 10/1973 | Zaid | 42/89 |
| 3,791,303 | 2/1974 | Sweeney et al. | 102/502 |
| 3,865,038 | 2/1975 | Barr | 102/502 |
| 3,921,614 | 11/1975 | Fogelgren | 124/30 R |
| 4,153,927 | 5/1979 | Owens | 362/99 |
| 4,352,316 | 10/1982 | Medlin | 89/36 A |
| 4,560,168 | 12/1985 | Aoyama | 273/232 |
| 4,686,905 | 8/1987 | Szabo | 102/444 |
| 4,979,747 | 12/1990 | Jonkouski | 273/232 |
| 5,035,183 | 7/1991 | Luxton | 102/502 |
| 5,078,117 | 1/1992 | Cover | 124/71 |
| 5,217,708 | 6/1993 | Pinkney | 424/45 |
| 5,254,379 | 10/1993 | Kotsiopoulos et al. | 428/35.7 |
| 5,353,712 | 10/1994 | Olson | 102/502 |
| 5,361,700 | 11/1994 | Carbone | 102/439 |
| 5,402,729 | 4/1995 | Richert | 102/502 |
| 5,565,649 | 10/1996 | Tougeron et al. | 102/502 |
| 5,620,704 | 4/1997 | Cade et al. | 424/456 |
| 5,639,526 | 6/1997 | Kotsiopoulos et al. | 102/502 |
| 5,640,945 | 6/1997 | Slonaker et al. | 124/56 |
| 5,671,559 | 9/1997 | Ludaesher et al. | 42/1.08 |

FOREIGN PATENT DOCUMENTS

| 4321041 | 1/1995 | Germany | 102/502 |
|---|---|---|---|
| WO 94/28371 | 12/1994 | WIPO | 102/502 |

Primary Examiner—Harold J. Tudor
Attorney, Agent, or Firm—Fitch, Even, Tabin & Flannery

[57] ABSTRACT

A projectile, in one embodiment, employs an inhibiting substance for impairing a living target, and a sealed capsule for containing the inhibiting substance. The sealed capsule employs a plurality of dimples or a matrix of global scoring in an exterior surface of the projectile, and bursts upon impact of the projectile with the living target and disperses the impairing substance. In another embodiment, the projectile has stabilizer body, and a sealed capsule carried by the stabilizer body for containing an impairing substance. The stabilizer body has a stabilizer portion, a puncture tube located in front of the stabilizer portion and behind the sealed capsule, and an atomization matrix located in front of the stabilizer portion. A further embodiment of the invention is a projectile employing a stabilizer body, and a canister carried by the stabilizer body for containing an impairing substance under pressure. The stabilizer body uses a stabilizer portion, and an atomization matrix located in front of the stabilizer portion. In a further embodiment, a projectile employs a rosin bag containing an irritating substance.

11 Claims, 3 Drawing Sheets

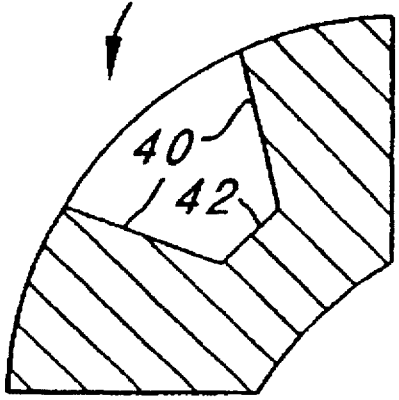

NON-LETHAL PROJECTILE FOR DELIVERING AN INHIBITING SUBSTANCE TO A LIVING TARGET

BACKGROUND OF THE INVENTION

The present invention relates to non-lethal projectiles, and more particularly to such projectiles for delivering an inhibiting substance to a living target. Even more particularly, the present invention relates to non-lethal projectiles for delivering pepper spray, tear gas or the like to a living target, such as a human target.

It is no secret that steadily rising crime rates and an increased need for crime control have created a need for technologically enhanced crime fighting devices. In particular, there is a need for non-lethal devices that are capable of incapacitating or inhibiting suspected criminals. For example, devices that stun, impair the vision of, impair the breathing of, or otherwise physically or mentally impair suspected criminals are needed.

One attempt to provide a non-lethal device for delivering an inhibiting substance is shown in U.S. Pat. No. 3,921,614, issued to Fogelgren for COMPRESSED GAS OPERATED GUN HAVING VARIABLE UPPER AND LOWER PRESSURE LIMITS OF OPERATION, incorporated herein by reference. Fogelgren describes a gas-operated gun and associated projectiles. In one illustrated embodiment, a projectile consists of a projectile casing that houses a structure in which a firing pin is situated so as to detonate a primary charge upon impact of the projectile with a target. Deterioration of the primary charge causes the expulsion of a load carried in a load chamber. The load chamber may contain various types of load, such as tear gas, dye, flash-powder or wadding.

Another embodiment illustrated in the Fogelgren patent consists of a projectile casing that encloses a body member, which together with a frontal member defines a load chamber. The body member and the frontal member are attached so as to be readily separable in flight to enable the load to escape from the load chamber and to proceed to the desired target. In this embodiment, the load is buckshot or plastic pellets.

A further embodiment of the projectile shown by Fogelgren stores a portion of a compressed gas utilized to expel the projectile to expel a load upon striking a target. Upon firing an outer body member separates from an inner body member, exposing and releasing a holding pin, that prevents premature release of the projectile's load. Apertures from which the load is expelled upon impact are sealed with wax to prevent expulsion of the load before the projectile impacts the target. The portion of the pressurized gas is stored in a rear chamber of the projectile during flight while the load is stored in a forward chamber. When the projectile strikes the target, the pressurized gas is released forcing the load through the apertures and out of the projectile.

An additional embodiment of the projectile shown by Fogelgren consists of outer members that form a container into which is fitted a breakable glass vile. Rearward of the breakable vile, padding is provided to prevent breakage of the vile upon firing of the projectile. Forward the vile is a firing pin assembly against which the breakable vile impacts as it shifts forward within the members forming the container upon impact. As with the above embodiment, a holding pin, which normally prevents the breakable vial from shifting forward in the container, is expelled as an outer body member separates from an inner body member. This allows the breakable vial to shift forward upon impact, shattering the breakable glass vial against the firing pin. The breakable vile contains a load to be delivered to the target, which is delivered through apertures near the front of the projectile upon the shattering of the breakable glass vial. The vile may be charged with a compressed gas so as to provide a charged load.

Disadvantageously, the projectiles described by Fogelgren, particularly those projectiles described that would be suitable for delivering loads such as tear gas or dye, are complicated, and therefore expensive to manufacture. The embodiment employing a portion of the pressurized gas used to expel the projectile to expel the load upon striking the target requires a greater amount of pressurized gas in order to both expel, i.e., fire the projectile and to provide the portion of pressurized gas for expelling the load. In addition, such embodiment requires complicated and tedious to manufacture components such as a microminiature ball valve (through which the portion of the pressurized gas enters the rear chamber upon firing), wax sealer within each of the plurality of apertures and a holding pin that must fall away from the projectile in flight.

The embodiment employing the breakable glass vial is also complicated to manufacture, because it also employs a holding pin that must fall away during the flight of the projectile and, employs numerous structures that must be precisely fitted together to allow them to separate during firing and in flight. This embodiment also must be carefully handled so that the breakable glass vial does not shatter while being handled by the user. This can be particularly problematic, for example, when the Fogelgren device is being used by a police officer in pursuit of a fleeing criminal (or when used by a police officer fleeing from an accused criminal). Thus, significant room for improvement still exists in the development of non-lethal projectiles.

Another approach to providing non-lethal projectiles for delivering an inhibiting substance to a living target is suggested in U.S. Pat. No. 5,254,379, issued to Kotsiopoulos, et al., for a PAINT BALL, incorporated herein by reference. Kotsiopoulos, et al.'s device is directed primarily to a paint ball projectile for delivering a load of paint to a target, and for expelling the paint onto the target upon impact. The paint ball shown by Kotsiopoulos, et al., consists of a shell that fractures in a predetermined pattern upon impact with a target. Kotsiopoulos, et al., make a passing reference to the use of such paint ball for delivering dyes, smoke or tear gas to a target.

Unfortunately, the paint ball shown by Kotsiopoulos, et al., due to its aerodynamics, lacks the ability to be fired over a sufficient distance with sufficient accuracy for many law enforcement applications. Furthermore, the Kotsiopoulos et al., paint ball, or other similar paint balls, may be too fragile, and therefore prone to breakage in the heat of pursuit, before firing, unless they are well protected in a container on the weapon or launch device used to fire them.

Thus, as will be appreciated by one skilled in the art, significant improvements are needed in non-lethal projectiles for delivering an inhibiting substance to a living target. The present invention advantageously addresses the above and other needs.

SUMMARY OF THE INVENTION

The present invention advantageously addresses the needs above as well as other needs by providing a non-lethal projectile for delivering an impairing or inhibiting substance, e.g., pepper spray, tear gas or the like, to a living target, such as a human target.

In one embodiment, the invention can be characterized as a projectile employing an impairing substance for impairing a living target, and a sealed capsule for containing the impairing substance. The sealed capsule employs a plurality of indented portions, such as dimples or a matrix of global surface scoring in an exterior surface of the projectile. The sealed capsule bursts upon impact of the projectile with the living target. Upon impact, the sealed capsule also disperses the impairing substance proximate to the target.

In order to facilitate dispersion or atomization of the inhibiting substance, the present embodiment, in one variation, includes basal portions of the dimples or surface scoring that explode upon impact.

In another embodiment, the projectile employs a stabilizer body, and a sealed capsule carried by the stabilizer body. The sealed capsule contains an impairing substance, and the stabilizer body is made from a stabilizer portion, a puncture tube, and an atomization matrix.

The puncture tube punctures the sealed capsule upon displacement of the sealed capsule into the puncture tube, and/or vice versa. The atomization matrix has at least one exit orifice and an interior portion. Upon impact with the target, after the sealed capsule is punctured, the inhibiting substance is released into the interior portion. From the interior portion, the inhibiting substance is released proximate to the projectile through the exit orifices.

In one variation, the sealed capsule in this other embodiment is coupled to a forward portion of the atomization matrix, and comprises a tip of the projectile. In this variation, when the projectile impacts against the target, the sealed capsule impacts against the target pushing the sealed capsule into the puncture tube.

In another variation, the sealed capsule is carried, at least in part, within the interior portion of the atomization matrix. In this other variation the projectile may include an impact piston located in front of the sealed capsule, and a piston cylinder located in front of the atomization matrix. The impact piston is slidable in a rearward direction within the piston cylinder upon impact of the projectile with the target, and facilitates the puncturing of the sealed capsule. The impact piston may serve as the tip of the projectile, whereby the impact piston impacts against the target upon impact of the projectile against the target. It is noted that the atomization matrix may, advantageously, be located near the rear of the projectile with exit holes thereof angled forward so as to direct the inhibiting substance toward the target. By placing the atomization matrix near the rearward end of the projectile, a wider angle of dispersion of the inhibiting substance is achieved, thereby increasing the likelihood that the inhibiting is effective, e.g., is delivered to the target's face.

In a further embodiment, the present invention can be characterized as a projectile employing a stabilizer body, and a canister carried by the stabilizer body. The canister contains an impairing substance under pressure, and employs a valve through which the impairing substance is released upon opening of the valve. The stabilizer body has a stabilizer portion, and an atomization matrix that includes at least one exit orifice and a central cavity.

Upon impact, the inhibiting substance is released into the central cavity after the opening of the valve, and is then released from the central cavity through the exit orifices to a space proximate to the projectile at its exterior.

In one variation, the projectile of this further embodiment may include an impact piston located in front of the canister, and a piston cylinder located in front of the atomization matrix. The impact piston is slidable in a rearward direction within the piston cylinder upon impact of the projectile with the target. When the impact piston is slid rearward, the valve is opened, thereby releasing the inhibiting substance into the interior portion of the atomization matrix.

In a further variation, the projectile of this further embodiment may employ an adhesive material and/or a mechanical attachment system, such as short barbed tips, to facilitate the attachment of the projectile to the target. Such attachment of the projectile to the target helps to assure that the inhibiting substance is delivered to the target. Without such attachment, the projectile will rebound off of the target following impact. Other approaches to attachment of the projectile to the target are shown in U.S. patent application Ser. No. 08/746,326 for NON-LETHAL PROJECTILE FOR DELIVERING AN ELECTRIC SHOCK TO A LIVING TARGET, of Coakley et al., filed Nov. 12, 1996, incorporated herein by reference.

In an additional embodiment, the present invention can be characterized as a system for delivering an inhibiting substance to a target. The system includes a launch device and a projectile. The projectile may be similar in structure and functionality to those projectiles described above, while the launch device may, for example, be a $CO_2$ operated launch mechanism, such as a paintball gun. Alternatively, the launch device may be covert in nature, such as a launch device incorporated into a PR24 police baton or a flashlight.

In another further embodiment, the present invention can be characterized as a projectile for delivering an inhibiting substance to a target, wherein the inhibiting substance includes a powdered Oleoresin Capsicum.

It is therefore a feature of the invention to provide a projectile for delivering an inhibiting substance to a target.

It is another feature of the invention, in some embodiments, to provide such projectile with a dimpled or globally scored exterior surface, thereby decreasing drag, increasing lift and improving accuracy, distance of flight and fluid atomization.

It is a further feature of the invention, in some embodiments, to provide the projectile with a stabilizer section that facilitates firing of the projectile over increased distances.

It is an additional feature of the invention, in some embodiments, to provide the projectile with a piston that forms a tip of the projectile that is slidable rearwardly upon impact so as to puncture a sealed capsule of the inhibiting substance, thereby releasing the inhibiting substance proximate to the target.

It is a further additional feature of the invention, in some embodiments, to provide a rosin bag projectile containing an inhibiting substance, such as a powdered inhibiting substance.

It is an added feature of the invention, in some embodiments, to provide the projectile with an atomization matrix that increases atomization of the inhibiting substance thereby enhancing effects of the inhibiting substance.

It is a supplementary feature of the invention, in some embodiments, to provide the projectile with a canister of the inhibiting substance under pressure, which canister includes a valve that is opened upon impact of the projectile against the target thereby releasing the inhibiting substance proximate to the target.

It is a further supplementary feature of the invention, in some embodiments, to provide an approach for attachment of the projectile to the target upon the impact of the projectile with the target, such as by an adhesive material or by barbed tips.

BRIEF DESCRIPTION OF THE DRAWINGS

Figure 1:
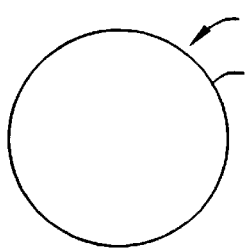
FIG. 1 is a circuit diagram showing a conventional power device.
Figure 2:
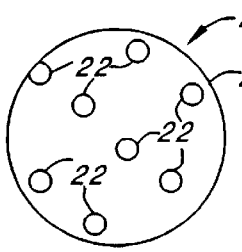
FIGS. 2 and 3 are explanatory circuit diagrams for the operation of the device shown in FIG. 1.
Figure 3:
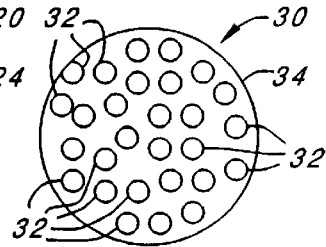
Figure 4:
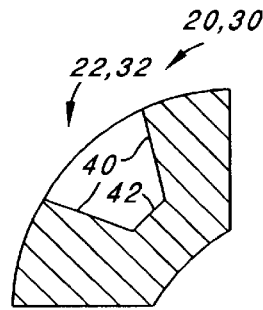
FIGS. 4 and 5 are waveform diagrams respectively for explaining the operation of the device of FIG. 1.
Figure 6:
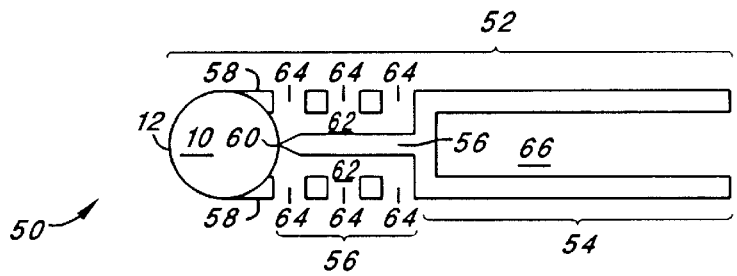
FIGS. 6 and 7 are explanatory circuit diagrams for the other operation of the device shown in FIG. 1.
Figure 7:
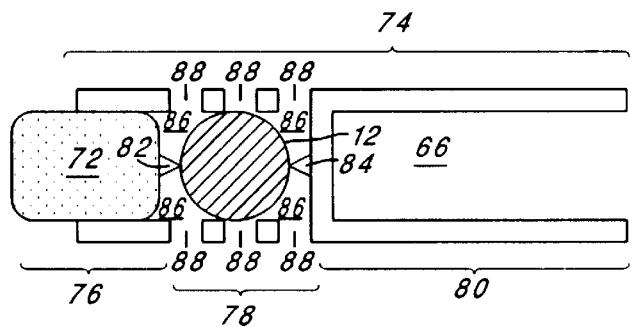
Figure 8:
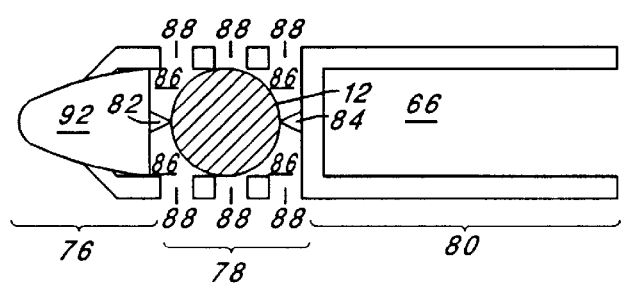
FIG. 8 is an explanatory waveform diagram for the other operation of the device shown in FIG. 1.
Figure 5:
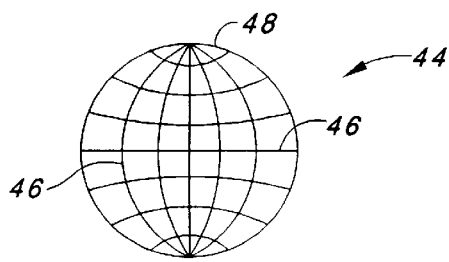
Figure 15:
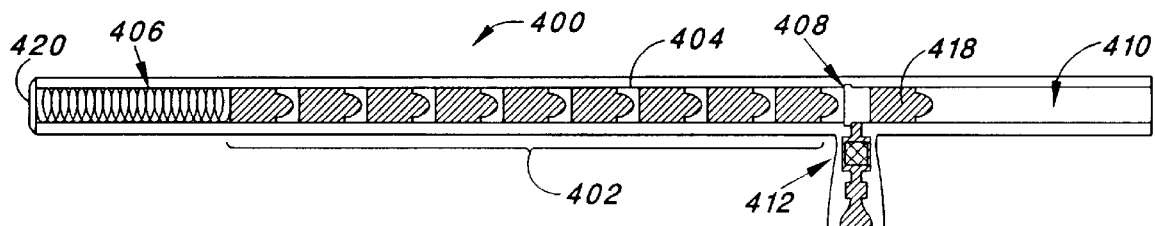

The above and other aspects, features and advantages of the present invention will be more apparent from the following more particular description thereof, presented in conjunction with the following drawings wherein:

FIG. 1 is a side view of a projectile for delivering an inhibiting substance, such as pepper spray, tear gas or the like, to a living target, such as a human target, in accordance with one embodiment of the present invention;

FIG. 2 is a side view of a projectile made in accordance with one variation of the projectile of FIG. 1 modified to include a pattern of exterior dimples that serve the tripartite purposes of decreasing drag, increasing lift, and facilitating atomization of the inhibiting substance upon impact with the living target;

FIG. 3 is a side view of a projectile made in accordance with another variation of the projectile of FIG. 1 modified to include another pattern of exterior dimples that serve the tripartite purposes of decreasing drag, increasing lift, and facilitating atomization of the inhibiting substance upon impact with the living target;

FIG. 4 is a partial cross-sectional view illustrating an example of an exterior dimples of the variations of the projectile shown in FIGS. 2 and 3;

FIG. 5 is a side-view of a projectile made in accordance with a further variation of the projectile of FIG. 1 modified to include a matrix pattern of exterior global scoring that serves the tripartite purposes of decreasing drag, increasing lift and facilitating atomization of the inhibiting substance upon impact with the living target;

FIG. 6 is a cross-sectional view of a projectile for delivering an inhibiting substance to a target in accordance with another embodiment of the present invention, wherein the embodiment of FIG. 1 is employed to carry the inhibiting substance, and a stabilizer portion is employed to increase range;

FIG. 7 is a cross-sectional view of a projectile made in accordance with one variation of the projectile of FIG. 6, wherein a plunger is employed to explode a capsule containing the inhibiting substance;

FIG. 8 is a cross-sectional view of a projectile made in accordance with another variation of the projectile of FIG. 6, wherein the plunger employed to explode the capsule containing the inhibiting substance is aerodynamically-shaped;

FIG. 9 is a cross-sectional view of a projectile made in accordance with a further variation of the projectile of FIG. 6, wherein the plunger is employed to explode a capsule containing the inhibiting substance, and wherein an atomization matrix made up of forward pointing exit orifices is located at a rearward end of the projectile in order to increase a spray pattern area on the target;

FIG. 10 is a cross-sectional view of a projectile made in accordance with a variation of the projectile of FIG. 9, wherein the plunger is employed to puncture a membrane behind which the inhibiting substance is encapsulated;

FIG. 11 is a cross-sectional view of a projectile for delivering an inhibiting substance to a living target in accordance with a further embodiment of the present invention, wherein the pressurized canister is employed to carry the inhibiting substance, and the stabilizer section is employed to increase range;

FIG. 12 is a cross-sectional view of the projectile for delivering an inhibiting substance to a living target, wherein a pressurized canister is employed to carry the inhibiting substance, and a stabilizer section is employed to increase range, and wherein the projectile employs an adhesive material and a mechanical attachment system to attach the projectile to the target during delivery of the inhibiting substance to the target and further employs forward pointing exit orifices to increase a spray pattern area on the target;

FIG. 13 is a cross-sectional view of a projectile for delivering an inhibiting substance to a living target in accordance with an additional embodiment of the present invention, wherein a twelve-gauge shotgun shell is packed with a rosin bag that contains an inhibiting substance, such as powdered or liquid Oleoresin Capsicum;

FIG. 14 is an end cross-sectional view of the projectile for delivering an inhibiting substance in accordance with the additional embodiment of FIG. 13;

FIG. 15 is a cross-sectional view of a launch device useable in combination with the projectile for delivering an inhibiting substance to a living target in accordance with an additional embodiment of the present invention, wherein the launch device assumes the form of a PR24 police baton thus allowing dual use of the launch device, i.e., as a launch device and as a PR24 police baton;

FIG. 16 is a cross-sectional view of a launch device suitably used with the projectile for delivering an inhibiting substance to a living target in accordance with another embodiment of the present invention, wherein the launch device assumes the form of a flashlight thus allowing dual use of the launch device, i.e., as a launch device and as a flashlight;

FIG. 17 is a cross-sectional view of an adaptation of the launch device of FIG. 15 for delivering ball-type projectiles; and FIG. 18 is a side cross-sectional view of an adaptation of the launch device of FIG. 16 for delivering ball-type projectiles, wherein a plurality of barrels, such as two, are employed so as to allow for the firing of multiple projectiles without reloading; and FIG. 19 is an end cross-sectional view of the adaptation of the launch device of FIG. 18 illustrating the plurality of barrels.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Referring first to FIG. 1, a side view is shown of a projectile 10 for delivering an inhibiting substance, such as, pepper spray, tear gas or the like, to a living target, such as a human target, in accordance with one embodiment of the present invention. In other embodiments, the projectile 10 may also be used to deliver other substances such as dies, paint, smoke or the like to a living or an inanimate target.

The projectile 10, in accordance with the present embodiment, includes an inhibiting substance (not shown) encapsulated within a plastic, gelatin or similar casing 12.

The inhibiting substance may include, for example, pepper spray, tear gas, Oleoresin Capsicum in powder or liquid form, or the like. The casing 12, or shell, may be made from acrylic, vinyl, sodium alginate, calcium chloride, coated alginate and/or polyvinyl alginate (PVA).

In operation, the projectile 10 may be rapid fired from a weapon, such as a compressed air pistol, compressed air rifle, a dual-use modified PR24 police baton, and/or a dual-use modified flashlight.

The outer diameter of the casing 12, or shell, is from between about 1.0 cm and 5.0 cm, e.g., 1.8 cm. The inner-diameter of the shell 12 (which defines the volume in which the inhibiting substance is carried) has a diameter of from between about 0.3 cm and 5.0 cm, e.g., 1.6 cm.

The casing 12 can be made using known encapsulation techniques or by injection molding and the inhibiting substance can be injected through an opening in the casing, which is later sealed, or through a capillary that pierces the casing during encapsulation.

Referring next to FIG. 2, a side view is shown of a projectile 20 made in accordance with one variation of the projectile 10 described above that has been modified to include a pattern of exterior dimples 22 in the shell 24 that serve the tripartite purposes of decreasing drag, increasing lift, and facilitating atomization of the inhibiting substance upon impact with the living target.

The projectile 20 of FIG. 2 is similar in materials, dimensions and manufacture to the projectile 10 shown in FIG. 1, but employs the pattern of exterior dimples 22 so as to provide lower drag and greater lift, thus making possible longer distances of flight. Furthermore, the dimples 22 provide structural weak points at which the casing 24 bursts upon impact with the target, thereby improving atomization of the inhibiting substance contained within the shell 24. This results in a larger and finer cloud of inhibiting substance proximate to the target immediately following impact of the projectile 20 with the target. The larger and finer cloud of inhibiting substance provides for more effective inhibiting of the target than has heretofore been possible with conventional projectiles.

The dimples 22 are preferably round at their exterior edge, have a frustioconical-shaped wall and a flat, circular innermost surface, or basal portion. The dimples 22 have a depth of between about 1 mm and 3 mm, e.g., 2 mm and preferably have a minimum depth of about 75% of the thickness of the casing or shell. Preferably, there are from between six and 50 dimples 22, e.g., 20 dimples, on the shell 24 so as to provide omnidirectional atomization of the inhibiting substance upon impact and a maximal decrease in drag and increase in lift.

The dimples 22 may be formed in the casing as a part of the injection molding process, using laser ablation techniques, or using other known plastics forming techniques.

Referring next to FIG. 3, a side view is shown of a projectile 30 made in accordance with another variation of the projectile modified to include another pattern of exterior dimples 32 in the shell 34 that serve the tripartite purposes of decreasing drag, increasing lift, and facilitating atomization of the inhibiting substance upon impact with the living target.

As can be seen, there are a greater number of exterior dimples 32 in the variation of FIG. 3, which may further decrease drag, increase lift and improve atomization. Preferably the dimples 34 are arranged in a pattern in the exterior surface of the casing so that each of six equal sectors of the casing show at least one dimple 32 thereon. Other dimple arrangements, such as are known in the golfing arts, may also be suitable. See, e.g., U.S. Pat. No. 4,560,168, issued to Aoyama, for a GOLF BALL, incorporated herein by reference.

Referring next to FIG. 4, a cross-sectional view is shown of an example of an exterior dimple 22, 32 of the above-described projectiles.

As can be seen, the dimple 22, 32 has frustoconical-shaped interior walls 40 and a flat innermost surface 42, or basal portion, with a depth of between about 1 mm and 3 mm, e.g., 2.0 mm, which is preferably about 75% of the thickness of the shell, at minimum. As mentioned above, the dimples 22, 32 can be produced using laser ablation techniques, by forming them into the shell using injection molding techniques, or using other known forming techniques.

FIG. 5 is a side-view of a projectile 44 made in accordance with a further variation of the projectile of FIG. 1 modified to include a matrix pattern of exterior global scoring 46 that serves the tripartite purposes of decreasing drag, increasing lift and facilitating atomization of the inhibiting substance upon impact with the living target.

The projectile 44 of FIG. 5 is similar in materials, dimensions and manufactured projectile 10 of FIG. 1, but employs the matrix pattern of exterior global scoring 46. The scoring provides a lattice of structural weak points at which a casing bursts upon impact with the target. As with the embodiment shown in FIG. 2, this results in a larger and finer cloud of inhibiting substance proximate to the target immediately following impact of the projectile 44 with the target, thus providing for more effective inhibiting of the target than had heretofore been possible with conventional projectile approaches. The scoring 46 is preferably "V"-shaped in cross-section with a flat bottom portion of the "V" providing a basel portion of such scoring. The scoring has a depth of from between about 1 mm and 3 mm, e.g. 2 mm and preferably has a minimum depth of about 75% of the thickness of the casing or shell 48. Preferably, there are from between about 2 and 10, e.g., 7, circumferential (i.e., latitudinal) scores and from between about 2 and 10, e.g., 7 longitudinal scores in the surface of the shell 48 so as to provide omnidirectional atomization of the inhibiting substance upon impact and a maximal decrease in drag and increase in lift for the projectile.

Referring next to FIG. 6, a cross-sectional view is shown of a projectile 50 for delivering an inhibiting substance to a living target in accordance with another embodiment of the present invention, wherein the projectile 10 of the embodiment of FIG. 1 is employed to carry the inhibiting substance, and a stabilizer body 52 is employed to increase range.

The projectile 50 of FIG. 6 employs the inhibiting substance encapsulated within the shell 12, such as described above. Alternatively, the shell may have a non-spherical shape, such as a bullet shape, e.g., elliptical, parabolical, prolate spheroidal, two-sheet hyperboloidal, or the like. The shell 12 is mounted to the stabilizer body 52, which has a stabilizer section 54, a puncture tube 56, and an atomization matrix 56. The shell 12 is mounted to the stabilizer body 52 on a forward edge 58 of the atomization matrix 56, and rests on a tip 60 of the puncture tube 56. Wax or adhesive may be used to hold the shell 12 in place.

Upon impacting with the target, the shell 12 is forced backwards (relative to the direction of flight of the projectile) into the tip 60 of the puncture tube 56, which punctures the shell 12. This releases the inhibiting substance contained within the shell 12 into an interior region 62 of the atomization matrix 56. From the interior region 62 of the atomization matrix 56, the inhibiting substance is released through a plurality of exit orifices 64 passing through the periphery of the atomization matrix. There are preferably from between 2 and 20, e.g., 10 exit orifices 64 in the atomization matrix 56. Each exit orifice 64 preferably has a circular shape and a diameter of from between about 0.5 mm and 4 mm, e.g., 1 mm.

The stabilizer body 52 is preferably circular in cross-section (taken normal to its direction of flight), having an outer diameter equal to the outer diameter of the shell 12, i.e., from between about 1.0 cm and 5.0 cm, e.g., 1.8 cm. The length of the stabilizer body 52 is from between about 1.5 cm and 5 cm, e.g., 3 cm, and the overall length of the projectile 50 (i.e., the stabilizer body and the shell) is from between about 2.5 cm and 10 cm, e.g., 5 cm. The stabilizer body 52 is preferably made from plastic or acrylonitrile butadiene styrene resin (ABS), and the stabilizer section 54 has a hollow rear section 66 that has a hollow interior with an inner diameter of from between 1.0 cm and 5 cm, e.g., 1.8 cm, and a depth of from between about 1 cm and 5 cm, e.g., 2 cm. The hollow rear section 66 serves to decrease the mass of the stabilizer body 52 without significant detrimental effect on the aerodynamics of the projectile 50. The stabilizer body 52 can be made using known plastics moulding techniques, such as injection moulding.

Referring next to FIG. 7, a cross-sectional view is shown of a projectile 70 made in accordance with one variation of the projectile 50 of FIG. 6, wherein a plunger 72, or impact piston, is employed to explode a shell 12 containing the inhibiting substance.

The projectile 70 has a stabilizer body 74, similar in function, dimensions and manufacture, to the stabilizer body 52 described above, and the impact piston 72 is slidable within a piston cylinder 76. The piston cylinder 76 is formed at a forward portion of an atomization matrix 78, similar to the atomization matrix 56 described above. The stabilizer body 74 also employs a stabilizer section 80, similar to the stabilizer section described above. The shell 12 is located between a pair of puncture tubes 82, 84, one of which forms a rearward portion of the impact piston 72, and one of which forms a forward portion of the stabilizer section 80. The shell 12 is located within the atomization matrix 78.

Upon impact with the target, the impact piston 72 is forced rearward by its impact against the target, squeezing the shell 12 between the puncture tubes 82, 84, ultimately causing the shell 12 to rupture. This releases the inhibiting substance within the shell 12 into an interior region 86 of the atomization matrix, from which the inhibiting substance escapes via exit orifices 88 similar to the exit orifices 64, described above.

Referring next to FIG. 8, a cross-sectional view is shown of a projectile 90 made in accordance with another variation of the projectile 50 of FIG. 6, wherein an impact piston 92 is employed to explode a shell 12 containing the inhibiting substance.

The projectile 90 of FIG. 8 is similar in structure and operation to the projectile 50 of FIG. 7 except as noted below. The projectile 90 of FIG. 8 employs the impact piston 92 having a bullet-shaped, e.g., elliptic paraboloid, prolate spheroid, two-sheet hyperboloid, or the like, forward end 94. Advantageously, this bullet-shaped forward end 94 provides improved aerodynamics for the projectile 90, thus facilitating firing over longer distances and/or using a lower-powered weapon than is needed to fire the projectiles of FIGS. 6 or 7.

FIG. 9 is a cross-sectional view of a projectile made in accordance with a further variation of the projectile 100, wherein a variation of the impact piston 109 is employed to explode the capsule 12 containing the inhibiting substance, and wherein the atomization matrix 104 is located at a rearward end of the projectile 100.

Shown are the shell 12 mounted to a stabilizer body 106 which has a puncture tube 108. An impact piston 109 is slidable within a piston cylinder 111 formed at a forward portion of the atomization matrix 104. The shell 12 is located between the impact piston 109 and the puncture tube 108. Advantageously, the atomization matrix 104 is located at a rearward section of the projectile and exit orifices 114 that make up the atomization matrix 104 are angled forward so as to direct inhibiting substance escaping therethrough toward the front of the projectile, i.e., toward the target. The impact piston 109 of the present embodiment preferably includes a rubber tip 116 aimed at minimizing damage to the target.

Upon impact with the target, the impact piston 109 is forced rearward by impact against the target, squeezing the shell 12 between the impact piston 109 and the puncture tube 108, ultimately causing the shell 12 to rupture. Such rupturing of the shell 12 releases the inhibiting substance within the shell 12 into an interior region 118 of the atomization matrix 104, from which the inhibiting substance escapes via the exit orifices 114 by which it is directed toward the target.

FIG. 10 is a cross-sectional view of a projectile 200 made in accordance with a variation of the projectile of FIG. 9, wherein the impact piston 110 is employed to puncture a membrane 202 behind which is contained the inhibiting substance 4. The membrane may be made from, for example, wax, plastic, acrylic or polyvinylchloride. In all other respects, the projectile 200 is substantially identical to the projectile 100 (FIG. 9), and therefore further explanation of its structure and functionality is not made herein.

Referring next to FIG. 11, a cross-sectional view is shown of a projectile 110 for delivering an inhibiting substance to a living target in accordance with a further embodiment of the present invention, wherein a pressurized canister 112 is employed to carry the inhibiting substance, and a stabilizer section 114 is employed to increase range.

Shown are a plurality of radially oriented exit orifices 116 emanating from a central release chamber 118 into which a valve 120 expels inhibiting substance upon being rearwardly displaced. Also shown are the stabilizer body 80 and a piston 92. The piston 92 is bullet-shaped, similar to the piston 92 shown in FIG. 7 above, with a puncture tube 82 located on a rearward portion thereof. The piston 92 is housed in a cylinder 122 that forms a forward portion of the stabilizer body 114. Alternatively, the pressurized canister 112 may be long enough to itself act also as the target piston 92, thus eliminating the need for a separate piston such as the piston 92. The stabilizer body 114 also includes a stabilizer section 80 similar to the stabilizer section 80 described above.

Upon impact, the piston 92 is displaced rearwardly within the cylinder 122, which forces the puncture tube 82 into the valve 120. In response to a force applied by the puncture tube 82, the valve 120 is rearwardly displaced. In response to such rearward displacement, the valve 120 releases the inhibiting substance into the central release chamber 118, from which the inhibiting substance escapes through the exit orifices 116, thereby dispersing the inhibiting substance proximate to the target. Preferably the exit orifices 116 are angled forward so as to better direct the inhibiting substance to the target.

The inhibiting substance is contained within the canister 112 which is formed in, or inserted into a portion 124 of the stabilizer body 114 in front of the stabilizer section. Within the canister 112, the inhibiting substance is pressurized so that it is readily expelled when the valve 120 is opened. The inhibiting substance may be pressurized using, e.g., compressed air techniques or aerosol techniques, such as are known in the art.

FIG. 12 is a cross-sectional view of the projectile 250 for delivering an inhibiting substance to a living target, wherein a pressurized canister 112 is employed to carry the inhibiting substance, and a stabilizer section 114 is employed to increase range, and wherein the projectile 250 employs an adhesive material 252 and a mechanical attachment system 254 to attach the projectile to the target during delivery of the inhibiting substance to the target.

Shown are a plurality of radially oriented exit orifices 116 emanating from a central release chamber 118 into which a valve 120 expels an inhibiting substance upon being rearwardly displaced. Also shown are the stabilizer body 80 and a piston 92. The piston 92 is bullet-shaped, similar to the piston shown in FIG. 11 above. The piston 92 is housed in a cylinder 122 that forms a forward portion of the stabilizer body 114. The stabilizer body 114 also includes a stabilizer section 80, which is similar to the stabilizer section 80 described above.

Upon impact the piston 92 is displaced rearwardly within the cylinder 122, which forces the pressurized canister 112 into the valve 120. In response to the force on the valve 120, the valve 120 is rearwardly displaced causing it to open and release the inhibiting substance into the central release chamber 118, from which the inhibiting substance escapes through the exit orifices 116, thereby dispersing the inhibiting substance proximate to the target.

Concomitantly with the rearwardly displacement of the piston 92, piston locks 256 lock the piston in its displaced position, which in turn locks the pressurized canister 112 in its displaced position, holding the valve 120 in an open state. The piston locks 256 may, for example, operate in a ratchet fashion.

The adhesive material 252 and mechanical attachment system 254, which may comprise a plurality of barbed tips 254, assure that once the projectile 250 impacts the target it will attach to the target during release of the inhibiting substance, so as to increase the effectivity of the inhibiting substance against the target. The adhesive material is preferably centrally located on a forward end of the piston 92, whereas the barbed tips 254 preferably are located peripherically around the forward end of the piston 92. (Note that in variations of the present embodiment either the adhesive material 252 or the mechanical attachment 254 may be used alone, instead of in combination with each other.)

FIG. 13 is a side cross-sectional view of a projectile 300 for delivering an inhibiting substance to a living target in accordance with an additional embodiment of the present invention, wherein a twelve-gauge shotgun shell 302 is packed with a rosin bag 304 that contains an inhibiting substance, such as Oleoresin Capsicum.

Shown are the twelve-gauge shotgun shell 302, the rosin bag 304, an airtight seal 306, wadding 308, and black powder 310.

Upon firing of the twelve-gauge shotgun shell 302, the black powder 310 is ignited, which causes the expansion of gases forcing the wadding 308 and the rosin bag 304 out of the twelve-gauge shotgun shell 302. Such forcing out of the wadding 308 and the rosin bag 304 breaks the airtight seal 306. The rosin bag 304, as mentioned above, contains Oleorosin Capsicum, in powder form, which upon impact with the target causes the target to be inhibited. (The rosin bag 304 is, as is known in the art, porous, so as to allow release of the powdered inhibiting substance upon impact of the rosin bag 304 with the target.)

Referring next to FIG. 14, an end cross-sectional view is shown of the projectile 300. Shown are the twelve-gauge shotgun shell 302 and the rosin bag 304. As can be seen, the rosin bag 304 is folded within the twelve-gauge shotgun shell 302 so as to fit tightly within the twelve-gauge shotgun shell 302. Upon firing of the twelve-gauge shotgun shell 302, the rosin bag 304 expands and unfolds prior to impact with the target so as to maximize exposure of the target to the rosin bag 304, thus maximizing its inhibiting effect.

Referring next to FIG. 15, a cross-sectional view is shown of a launch device 400 useable in combination with projectiles described herein for delivering an inhibiting substance to a living target. Advantageously, the launch device depicted is in the form of a PR24 police baton, such as those commonly used by law enforcement officers. Shown are a plurality of projectiles 402 loaded within a chamber 404 of the launch device. The chamber 404 also houses a spring 406, which is used to push the projectiles 402 into position for firing. A flapper valve 408 retains the projectiles 402, allowing only a single projectile 418 to move into a barrel 410 for firing. The chamber 404 and the barrel 410 together form the baton portion of the PR24 police baton.

Within a handle portion of such baton, a valve switch 412 and a propellent cylinder 414 are housed. A removable cap 416 on an end of the handle portion can be used to load the propellant cylinder 414 into the device 400. When launch of a projectile is desired, the valve 412 is opened by operation of a button or trigger (not shown) which releases a measured amount of propellent from the propellent cylinder 414 into the barrel 410 behind the single projectile 418. This propellent is preferably $CO_2$ or compressed air and propels the single projectile 418 down the barrel and out the end of the launch device toward a target. When reloading of the device is desired, another removable cap 420 is removed, along with the spring 406, and a plurality of projectiles are loaded into the chamber 402 behind the flapper valve 408.

Referring next to FIG. 16, a cross-sectional view is shown of a launch device 450 useable with projectiles described above for delivering an inhibiting substance in accordance with another embodiment of the present invention. Advantageously the launch device 450 assumes the form of a flashlight, including batteries 452, an on/off switch 454 and a reflector housing 456 of conventional design. Also shown are a propellent cylinder 458, a valve switch 460, a projectile 462, a barrel 464 and a removable cap 466.

When firing of the projectile 462 is desired, the removal cap 466, which may be attached on one side, such as by a hinge, is opened, the device 450 is aimed at the target and the valve switch 460 is opened by the depression of a button or trigger (not shown). The opening of the valve switch 460 releases propellent gas from the propellent cylinder 458 into the barrel 464 behind the projectile 462, thus propelling the projectile 462 down the barrel 464 toward the target whereat it delivers the inhibiting substance to the target.

Referring next to FIG. 17, a cross-sectional view is shown of an adaptation of the launch device 500 of FIG. 14 for delivering ball-type projectiles in rapid successive firings. Shown is the spring 502, the projectile chamber 504, the valve 506, the propellent cylinder 508, the barrel 510, the flapper valve 512, the projectile in position for launch 514, the removable cap 516 and the other removable cap 518. Operation of the launch device 500 depicted in FIG. 17 is substantially identical to operation of the launch device 400 depicted in FIG. 15 and therefore further explanation of the functionality and structure depicted is not made herein.

Referring next to FIG. 18, a cross-sectional view is shown of an adaptation of a launch device 550 for delivering ball-type projectiles, wherein a plurality of barrels 566, 568 are employed to allow the simultaneous or rapid successive firing of projectiles 562, 565 without reloading. Shown are the batteries 552, the on/off switch 554, the reflector housing 556, the propellent cylinder 558, the valve switch 560 and the removable cover 566. The propellant cartridge 558, the valve switch 560, the removable cover 556, the projectiles 562, 564 and the barrels 556, 568 are housed within enlarged portion 570 of the launch device 550 so as to accommodate the two barrels 566, 568 within the circumference of the launch device 550. Except as noted herein above, the structure and operation of the launch device depicted in FIG. 18 is substantially identical to the structure and function of the launch device depicted in FIG. 16, and therefore further explanation of the launch device of FIG. 18 is not made herein except to note the valve switch 560 is preferably selective, such that the firing of a projectile from only one of the barrels 566, 568 at a time occurs. For example, a first depression of a button, may cause the valve switch 560 to direct a measured amount of propellant gas into one of the barrels 566, and a second depression of the button may cause the valve switch 560 to direct the measured amount of propellant gas into the other of the barrels 568. Other embodiments may allow simultaneous firing of projectiles from both barrels 566, 568 or manual selection of from which barrel 566, 568 to fire, and therefore selection of which projectile to fire. This latter embodiment may be useful, for example when two different projectiles carrying two different inhibiting substances are utilized.

Referring next to FIG. 19, an end view is shown of the launch device 550 described in FIG. 18, wherein two or more barrels 566, 568 allow multiple, simultaneous or rapid successive projectile launches.

What is claimed is:

1. A spherical projectile comprising:
   a powdered inhibiting substance; and
   a sealed spherical capsule for containing and delivering the powdered substance to a target, the sealed capsule having a thickness and including:
   a plurality of structurally weakening dimples in an exterior surface of the projectile, wherein the structurally weakening dimples have a minimum depth of about 75% of the thickness of the sealed capsule and wherein, upon impact of the projectile with the target, the sealed capsule bursts and the powdered substance contained therein disperses proximate to the target.

2. The projectile of claim 1 wherein at least a portion of the plurality of structurally weakening dimples comprise a structurally weakening basal portion.

3. The projectile of claim 1 wherein said powdered inhibiting substance is Oleoresin Capsicum.

4. The projectile of claim 1 wherein said sealed capsule comprises a material selected from the group consisting of plastic and gelatin.

5. The projectile of claim 1 wherein said sealed capsule comprises a material selected from the group consisting of sodium alginate, calcium chloride, coated alginate and polyvinyl alginate.

6. The projectile of claim 1 wherein said powdered inhibiting substance includes powdered pepper spray.

7. The projectile of claim 1 wherein said powdered inhibiting substance includes tear gas.

8. The projectile of claim 1 wherein said plurality of structurally weakening dimples includes at least 6 dimples wherein at least one of said plurality of dimples is positioned in each of six equal sectors of the sealed capsule.

9. The projectile of claim 8 wherein each said plurality of structurally weakening dimples includes a circular exterior edge.

10. The projectile of claim 9 wherein each of said plurality of dimples includes frustoconical-shaped walls and a basal portion.

11. The projectile of claim 10 wherein each of said basal portions are circular in shape.

* * * * *

UNITED STATES PATENT AND TRADEMARK OFFICE
CERTIFICATE OF CORRECTION

PATENT NO. : 5,965,839
DATED : October 12, 1999
INVENTOR(S) : Vasel et al.

It is certified that error appears in the above-identified patent and that said Letters Patent is hereby corrected as shown below:

Title page,
The title page should be deleted to appear as per attached title page. Please delete columns 1-14 and substitute columns 1-14 as per attached.

Signed and Sealed this

Fifth Day of February, 2002

Attest:

JAMES E. ROGAN
Attesting Officer     Director of the United States Patent and Trademark Office

United States Patent [19]
Vasel et al.

[11] Patent Number: 5,965,839
[45] Date of Patent: Oct. 12, 1999

[54] NON-LETHAL PROJECTILE FOR DELIVERING AN INHIBITING SUBSTANCE TO A LIVING TARGET

[75] Inventors: Edward J. Vasel; Scott C. Nunan; Gregory A. Niederhaus, all of San Diego; Peter G. Coakley, Cardiff, all of Calif.

[73] Assignee: Jaycor, San Diego, Calif.

[21] Appl. No.: 08/751,709

[22] Filed: Nov. 18, 1996

[51] Int. Cl.⁶ .................................................. F42B 12/46
[52] U.S. Cl. ...................... 102/502; 102/367; 102/370; 102/444; 102/529; 473/577
[58] Field of Search .................................... 102/367, 370, 102/444, 502, 513, 395, 498, 529, 512; 473/577

[56] References Cited

U.S. PATENT DOCUMENTS

| | | | |
|---|---|---|---|
| 1,517,554 | 12/1924 | Fulcher | 102/370 |
| 3,419,274 | 12/1968 | Tabor | 102/517 |
| 3,650,213 | 3/1972 | Abbott et al. | 102/444 |
| 3,707,793 | 1/1973 | Holton, II | 42/1 G |
| 3,765,116 | 10/1973 | Zaid | 42/89 |
| 3,791,303 | 2/1974 | Sweeney et al. | 102/502 |
| 3,865,038 | 2/1975 | Barr | 102/502 |
| 3,921,614 | 11/1975 | Fogelgren | 124/30 R |
| 4,153,927 | 5/1979 | Owens | 362/99 |
| 4,352,316 | 10/1982 | Medlin | 89/36 A |
| 4,560,168 | 12/1985 | Aoyama | 273/232 |
| 4,686,905 | 8/1987 | Szabo | 102/444 |
| 4,979,747 | 12/1990 | Jonkouski | 273/232 |
| 5,035,183 | 7/1991 | Luxton | 102/502 |
| 5,078,117 | 1/1992 | Cover | 124/71 |
| 5,217,708 | 6/1993 | Pinkney | 424/45 |
| 5,254,379 | 10/1993 | Kotsiopoulos et al. | 428/35.7 |
| 5,353,712 | 10/1994 | Olson | 102/502 |
| 5,361,700 | 11/1994 | Carbone | 102/439 |
| 5,402,729 | 4/1995 | Richert | 102/502 |
| 5,565,649 | 10/1996 | Tougeron et al. | 102/502 |
| 5,620,704 | 4/1997 | Cade et al. | 424/456 |
| 5,639,526 | 6/1997 | Kotsiopoulos et al. | 102/502 |
| 5,640,945 | 6/1997 | Slonaker et al. | 124/56 |
| 5,671,559 | 9/1997 | Ludaesher et al. | 42/1.08 |

FOREIGN PATENT DOCUMENTS

| | | | |
|---|---|---|---|
| 4321041 | 1/1995 | Germany | 102/502 |
| WO 94/28371 | 12/1994 | WIPO | 102/502 |

*Primary Examiner*—Harold J. Tudor
*Attorney, Agent, or Firm*—Fitch, Even, Tabin & Flannery

[57] ABSTRACT

A projectile, in one embodiment, employs an inhibiting substance for impairing a living target, and a sealed capsule for containing the inhibiting substance. The sealed capsule employs a plurality of dimples or a matrix of global scoring in an exterior surface of the projectile, and bursts upon impact of the projectile with the living target and disperses the impairing substance. In another embodiment, the projectile has stabilizer body, and a sealed capsule carried by the stabilizer body for containing an impairing substance. The stabilizer body has a stabilizer portion, a puncture tube located in front of the stabilizer portion and behind the sealed capsule, and an atomization matrix located in front of the stabilizer portion. A further embodiment of the invention is a projectile employing a stabilizer body, and a canister carried by the stabilizer body for containing an impairing substance under pressure. The stabilizer body uses a stabilizer portion, and an atomization matrix located in front of the stabilizer portion. In a further embodiment, a projectile employs a rosin bag containing an irritating substance.

11 Claims, 3 Drawing Sheets

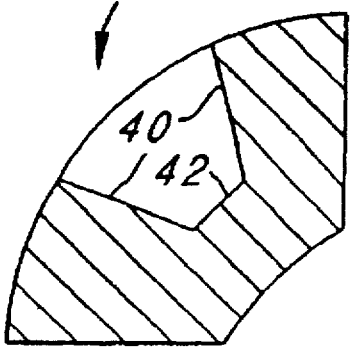

NON-LETHAL PROJECTILE FOR DELIVERING AN INHIBITING SUBSTANCE TO A LIVING TARGET

BACKGROUND OF THE INVENTION

The present invention relates to non-lethal projectiles, and more particularly to such projectiles for delivering an inhibiting substance to a living target. Even more particularly, the present invention relates to non-lethal projectiles for delivering pepper spray, tear gas or the like to a living target, such as a human target.

It is no secret that steadily rising crime rates and an increased need for crime control have created a need for technologically enhanced crime fighting devices. In particular, there is a need for non-lethal devices that are capable of incapacitating or inhibiting suspected criminals. For example, devices that stun, impair the vision of, impair the breathing of, or otherwise physically or mentally impair suspected criminals are needed.

One attempt to provide a non-lethal device for delivering an inhibiting substance is shown in U.S. Pat. No. 3,921,614, issued to Fogelgren for COMPRESSED GAS OPERATED GUN HAVING VARIABLE UPPER AND LOWER PRESSURE LIMITS OF OPERATION, incorporated herein by reference. Fogelgren describes a gas-operated gun and associated projectiles. In one illustrated embodiment, a projectile consists of a projectile casing that houses a structure in which a firing pin is situated so as to detonate a primary charge upon impact of the projectile with a target. Deterioration of the primary charge causes the expulsion of a load carried in a load chamber. The load chamber may contain various types of load, such as tear gas, dye, flash-powder or wadding.

Another embodiment illustrated in the Fogelgren patent consists of a projectile casing that encloses a body member, which together with a frontal member defines a load chamber. The body member and the frontal member are attached so as to be readily separable in flight to enable the load to escape from the load chamber and to proceed to the desired target. In this embodiment, the load is buckshot or plastic pellets.

A further embodiment of the projectile shown by Fogelgren stores a portion of a compressed gas utilized to expel the projectile to expel a load upon striking a target. Upon firing an outer body member separates from an inner body member, exposing and releasing a holding pin, that prevents premature release of the projectile's load. Apertures from which the load is expelled upon impact are sealed with wax to prevent expulsion of the load before the projectile impacts the target. The portion of the pressurized gas is stored in a rear chamber of the projectile during flight while the load is stored in a forward chamber. When the projectile strikes the target, the pressurized gas is released forcing the load through the apertures and out of the projectile.

An additional embodiment of the projectile shown by Fogelgren consists of outer members that form a container into which is fitted a breakable glass vile. Rearward of the breakable vile, padding is provided to prevent breakage of the vile upon firing of the projectile. Forward the vile is a firing pin assembly against which the breakable vile impacts as it shifts forward within the members forming the container upon impact. As with the above embodiment, a holding pin, which normally prevents the breakable vial from shifting forward in the container, is expelled as an outer body member separates from an inner body member. This allows the breakable vial to shift forward upon impact, shattering the breakable glass vial against the firing pin. The breakable vile contains a load to be delivered to the target, which is delivered through apertures near the front of the projectile upon the shattering of the breakable glass vial. The vile may be charged with a compressed gas so as to provide a charged load.

Disadvantageously, the projectiles described by Fogelgren, particularly those projectiles described that would be suitable for delivering loads such as tear gas or dye, are complicated, and therefore expensive to manufacture. The embodiment employing a portion of the pressurized gas used to expel the projectile to expel the load upon striking the target requires a greater amount of pressurized gas in order to both expel, i.e., fire the projectile and to provide the portion of pressurized gas for expelling the load. In addition, such embodiment requires complicated and tedious to manufacture components such as a microminiature ball valve (through which the portion of the pressurized gas enters the rear chamber upon firing), wax sealer within each of the plurality of apertures and a holding pin that must fall away from the projectile in flight.

The embodiment employing the breakable glass vial is also complicated to manufacture, because it also employs a holding pin that must fall away during the flight of the projectile and, employs numerous structures that must be precisely fitted together to allow them to separate during firing and in flight. This embodiment also must be carefully handled so that the breakable glass vial does not shatter while being handled by the user. This can be particularly problematic, for example, when the Fogelgren device is being used by a police officer in pursuit of a fleeing criminal (or when used by a police officer fleeing from an accused criminal). Thus, significant room for improvement still exists in the development of non-lethal projectiles.

Another approach to providing non-lethal projectiles for delivering an inhibiting substance to a living target is suggested in U.S. Pat. No. 5,254,379, issued to Kotsiopoulos, et al., for a PAINTBALL, incorporated herein by reference. Kotsiopoulos, et al.'s device is directed primarily to a paint ball projectile for delivering a load of paint to a target, and for expelling the paint onto the target upon impact. The paint ball shown by Kotsiopoulos, et al., consists of a shell that fractures in a predetermined pattern upon impact with a target. Kotsiopoulos, et al, make a passing reference to the use of such paint ball for delivering dyes, smoke or tear gas to a target.

Unfortunately, the paint ball shown by Kotsiopoulos, et al., due to its aerodynamics, lacks the ability to be fired over a sufficient distance with sufficient accuracy for many law enforcement applications. Furthermore, the Kotsiopoulos et al., paint ball, or other similar paint balls, may be too fragile, and therefore prone to breakage in the heat of pursuit, before firing, unless they are well protected in a container on the weapon or launch device used to fire them.

Thus, as will be appreciated by one skilled in the art, significant improvements are needed in non-lethal projectiles for delivering an inhibiting substance to a living target. The present invention advantageously addresses the above and other needs.

SUMMARY OF THE INVENTION

The present invention advantageously addresses the needs above as well as other needs by providing a non-lethal projectile for delivering an impairing or inhibiting substance, e.g., pepper spray, tear gas or the like, to a living target, such as a human target.

In one embodiment, the invention can be characterized as a projectile employing an impairing substance for impairing a living target, and a sealed capsule for containing the impairing substance. The sealed capsule employs a plurality of indented portions, such as dimples or a matrix of global surface scoring in an exterior surface of the projectile. The sealed capsule bursts upon impact of the projectile with the living target. Upon impact, the sealed capsule also disperses the impairing substance proximate to the target.

In order to facilitate dispersion or atomization of the inhibiting substance, the present embodiment, in one variation, includes basal portions of the dimples or surface scoring that explode upon impact.

In another embodiment, the projectile employs a stabilizer body, and a sealed capsule carried by the stabilizer body. The sealed capsule contains an impairing substance, and the stabilizer body is made from a stabilizer portion, a puncture tube, and an atomization matrix.

The puncture tube punctures the sealed capsule upon displacement of the sealed capsule into the puncture tube, and/or vice versa. The atomization matrix has at least one exit orifice and an interior portion. Upon impact with the target, after the sealed capsule is punctured, the inhibiting substance is released into the interior portion. From the interior portion, the inhibiting substance is released proximate to the projectile through the exit orifices.

In one variation, the sealed capsule in this other embodiment is coupled to a forward portion of the atomization matrix, and comprises a tip of the projectile. In this variation, when the projectile impacts against the target, the sealed capsule impacts against the target pushing the sealed capsule into the puncture tube.

In another variation, the sealed capsule is carried, at least in part, within the interior portion of the atomization matrix. In this other variation the projectile may include an impact piston located in front of the sealed capsule, and a piston cylinder located in front of the atomization matrix. The impact piston is slidable in a rearward direction within the piston cylinder upon impact of the projectile with the target, and facilitates the puncturing of the sealed capsule. The impact piston may serve as the tip of the projectile, whereby the impact piston impacts against the target upon impact of the projectile against the target. It is noted that the atomization matrix may, advantageously, be located near the rear of the projectile with exit holes thereof angled forward so as to direct the inhibiting substance toward the target. By placing the atomization matrix near the rearward end of the projectile, a wider angle of dispersion of the inhibiting substance is achieved, thereby increasing the likelihood that the inhibiting is effective, e.g., is delivered to the target's face.

In a further embodiment, the present invention can be characterized as a projectile employing a stabilizer body, and a canister carried by the stabilizer body. The canister contains an impairing substance under pressure, and employs a valve through which the impairing substance is released upon opening of the valve. The stabilizer body has a stabilizer portion, and an atomization matrix that includes at least one exit orifice and a central cavity.

Upon impact, the inhibiting substance is released into the central cavity after the opening of the valve, and is then released from the central cavity through the exit orifices to a space proximate to the projectile at its exterior.

In one variation, the projectile of this further embodiment may include an impact piston located in front of the canister, and a piston cylinder located in front of the atomization matrix. The impact piston is slidable in a rearward direction within the piston cylinder upon impact of the projectile with the target. When the impact piston is slid rearward, the valve is opened, thereby releasing the inhibiting substance into the interior portion of the atomization matrix.

In a further variation, the projectile of this further embodiment may employ an adhesive material and/or a mechanical attachment system, such as short barbed tips, to facilitate the attachment of the projectile to the target. Such attachment of the projectile to the target helps to assure that the inhibiting substance is delivered to the target. Without such attachment, the projectile will rebound off of the target following impact. Other approaches to attachment of the projectile to the target are shown in U.S. patent application Ser. No. 08/746,326 for NON-LETHAL PROJECTILE FOR DELIVERING AN ELECTRIC SHOCK TO A LIVING TARGET, of Coakley et al., filed Nov. 12, 1996, incorporated herein by reference.

In an additional embodiment, the present invention can be characterized as a system for delivering an inhibiting substance to a target. The system includes a launch device and a projectile. The projectile may be similar in structure and functionality to those projectiles described above, while the launch device may, for example, be a $CO_2$ operated launch mechanism, such as a paintball gun. Alternatively, the launch device may be covert in nature, such as a launch device incorporated into a PR24 police baton or a flashlight.

In another further embodiment, the present invention can be characterized as a projectile for delivering an inhibiting substance to a target, wherein the inhibiting substance includes a powdered Oleoresin Capsicum.

It is therefore a feature of the invention to provide a projectile for delivering an inhibiting substance to a target.

It is another feature of the invention, in some embodiments, to provide such projectile with a dimpled or globally scored exterior surface, thereby decreasing drag, increasing lift and improving accuracy, distance of flight and fluid atomization.

It is a further feature of the invention, in some embodiments, to provide the projectile with a stabilizer section that facilitates firing of the projectile over increased distances.

It is an additional feature of the invention, in some embodiments, to provide the projectile with a piston that forms a tip of the projectile that is slidable rearwardly upon impact so as to puncture a sealed capsule of the inhibiting substance, thereby releasing the inhibiting substance proximate to the target.

It is a further additional feature of the invention, in some embodiments, to provide a rosin bag projectile containing an inhibiting substance, such as a powdered inhibiting substance.

It is an added feature of the invention, in some embodiments, to provide the projectile with an atomization matrix that increases atomization of the inhibiting substance thereby enhancing effects of the inhibiting substance.

It is a supplementary feature of the invention, in some embodiments, to provide the projectile with a canister of the inhibiting substance under pressure, which canister includes a valve that is opened upon impact of the projectile against the target thereby releasing the inhibiting substance proximate to the target.

It is a further supplementary feature of the invention, in some embodiments, to provide an approach for attachment of the projectile to the target upon the impact of the projectile with the target, such as by an adhesive material or by barbed tips.

BRIEF DESCRIPTION OF THE DRAWINGS

The above and other aspects, features and advantages of the present invention will be more apparent from the following more particular description thereof, presented in conjunction with the following drawings wherein:

FIG. 1 is a side view of a projectile for delivering an inhibiting substance, such as pepper spray, tear gas or the like, to a living target, such as a human target, in accordance with one embodiment of the present invention;

FIG. 2 is a side view of a projectile made in accordance with one variation of the projectile of FIG. 1 modified to include a pattern of exterior dimples that serve the tripartite purposes of decreasing drag, increasing lift, and facilitating atomization of the inhibiting substance upon impact with the living target;

FIG. 3 is a side view of a projectile made in accordance with another variation of the projectile of FIG. 1 modified to include another pattern of exterior dimples that serve the tripartite purposes of decreasing drag, increasing lift, and facilitating atomization of the inhibiting substance upon impact with the living target;

FIG. 4 is a partial cross-sectional view illustrating an example of an exterior dimples of the variations of the projectile shown in FIGS. 2 and 3;

FIG. 5 is a side-view of a projectile made in accordance with a further variation of the projectile of FIG. 1 modified to include a matrix pattern of exterior global scoring that serves the tripartite purposes of decreasing drag, increasing lift and facilitating atomization of the inhibiting substance upon impact with the living target;

FIG. 6 is a cross-sectional view of a projectile for delivering an inhibiting substance to a target in accordance with another embodiment of the present invention, wherein the embodiment of FIG. 1 is employed to carry the inhibiting substance, and a stabilizer portion is employed to increase range;

FIG. 7 is a cross-sectional view of a projectile made in accordance with one variation of the projectile of FIG. 6, wherein a plunger is employed to explode a capsule containing the inhibiting substance;

FIG. 8 is a cross-sectional view of a projectile made in accordance with another variation of the projectile of FIG. 6, wherein the plunger employed to explode the capsule containing the inhibiting substance is aerodynamically-shaped;

FIG. 9 is a cross-sectional view of a projectile made in accordance with a further variation of the projectile of FIG. 6, wherein the plunger is employed to explode a capsule containing the inhibiting substance, and wherein an atomization matrix made up of forward pointing exit orifices is located at a rearward end of the projectile in order to increase a spray pattern area on the target;

FIG. 10 is a cross-sectional view of a projectile made in accordance with a variation of the projectile of FIG. 9, wherein the plunger is employed to puncture a membrane behind which the inhibiting substance is encapsulated;

FIG. 11 is a cross-sectional view of a projectile for delivering an inhibiting substance to a living target in accordance with a further embodiment of the present invention, wherein the pressurized canister is employed to carry the inhibiting substance, and the stabilizer section is employed to increase range;

FIG. 12 is a cross-sectional view of the projectile for delivering an inhibiting substance to a living target, wherein a pressurized canister is employed to carry the inhibiting substance, and a stabilizer section is employed to increase range, and wherein the projectile employs an adhesive material and a mechanical attachment system to attach the projectile to the target during delivery of the inhibiting substance to the target and further employs forward pointing exit orifices to increase a spray pattern area on the target;

FIG. 13 is a cross-sectional view of a projectile for delivering an inhibiting substance to a living target in accordance with an additional embodiment of the present invention, wherein a twelve-gauge shotgun shell is packed with a rosin bag that contains an inhibiting substance, such as powdered or liquid Oleoresin Capsicum;

FIG. 14 is an end cross-sectional view of the projectile for delivering an inhibiting substance in accordance with the additional embodiment of FIG. 13;

FIG. 15 is a cross-sectional view of a launch device useable in combination with the projectile for delivering an inhibiting substance to a living target in accordance with an additional embodiment of the present invention, wherein the launch device assumes the form of a PR24 police baton thus allowing dual use of the launch device, i.e., as a launch device and as a PR24 police baton;

FIG. 16 is a cross-sectional view of a launch device suitably used with the projectile for delivering an inhibiting substance to a living target in accordance with another embodiment of the present invention, wherein the launch device assumes the form of a flashlight thus allowing dual use of the launch device, i.e., as a launch device and as a flashlight;

FIG. 17 is a cross-sectional view of an adaptation of the launch device of FIG. 15 for delivering ball-type projectiles; and FIG. 18 is a side cross-sectional view of an adaptation of the launch device of FIG. 16 for delivering ball-type projectiles, wherein a plurality of barrels, such as two, are employed so as to allow for the firing of multiple projectiles without reloading; and FIG. 19 is an end cross-sectional view of the adaptation of the launch device of FIG. 18 illustrating the plurality of barrels.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Referring first to FIG. 1, a side view is shown of a projectile 10 for delivering an inhibiting substance, such as, pepper spray, tear gas or the like, to a living target, such as a human target, in accordance with one embodiment of the present invention. In other embodiments, the projectile 10 may also be used to deliver other substances such as dies, paint, smoke or the like to a living or an inanimate target.

The projectile 10, in accordance with the present embodiment, includes an inhibiting substance (not shown) encapsulated within a plastic, gelatin or similar casing 12.

The inhibiting substance may include, for example, pepper spray, tear gas, Oleoresin Capsicum in powder or liquid form, or the like. The casing 12, or shell, may be made from acrylic, vinyl, sodium alginate, calcium chloride, coated alginate and/or polyvinyl alginate (PVA).

In operation, the projectile 10 may be rapid fired from a weapon, such as a compressed air pistol, compressed air rifle, a dual-use modified PR24 police baton, and/or a dual-use modified flashlight.

The outer diameter of the casing 12, or shell, is from between about 1.0 cm and 5.0 cm, e.g., 1.8 cm. The inner-diameter of the shell 12 (which defines the volume in which the inhibiting substance is carried) has a diameter of from between about 0.3 cm and 5.0 cm, e.g., 1.6 cm.

The casing 12 can be made using known encapsulation techniques or by injection molding and the inhibiting substance can be injected through an opening in the casing, which is later sealed, or through a capillary that pierces the casing during encapsulation.

Referring next to FIG. 2, a side view is shown of a projectile 20 made in accordance with one variation of the projectile 10 described above that has been modified to include a pattern of exterior dimples 22 in the shell 24 that serve the tripartite purposes of decreasing drag, increasing lift, and facilitating atomization of the inhibiting substance upon impact with the living target.

The projectile 20 of FIG. 2 is similar in materials, dimensions and manufacture to the projectile 10 shown in FIG. 1, but employs the pattern of exterior dimples 22 so as to provide lower drag and greater lift, thus making possible longer distances of flight. Furthermore, the dimples 22 provide structural weak points at which the casing 24 bursts upon impact with the target, thereby improving atomization of the inhibiting substance contained within the shell 24. This results in a larger and finer cloud of inhibiting substance proximate to the target immediately following impact of the projectile 20 with the target. The larger and finer cloud of inhibiting substance provides for more effective inhibiting of the target than has heretofore been possible with conventional projectiles.

The dimples 22 are preferably round at their exterior edge, have a frustioconical-shaped wall and a flat, circular innermost surface, or basal portion. The dimples 22 have a depth of between about 1 mm and 3 mm, e.g., 2 mm and preferably have a minimum depth of about 75% of the thickness of the casing or shell. Preferably, there are from between six and 50 dimples 22, e.g., 20 dimples, on the shell 24 so as to provide omnidirectional atomization of the inhibiting substance upon impact and a maximal decrease in drag and increase in lift.

The dimples 22 may be formed in the casing as a part of the injection molding process, using laser ablation techniques, or using other known plastics forming techniques.

Referring next to FIG. 3, a side view is shown of a projectile 30 made in accordance with another variation of the projectile modified to include another pattern of exterior dimples 32 in the shell 34 that serve the tripartite purposes of decreasing drag, increasing lift, and facilitating atomization of the inhibiting substance upon impact with the living target.

As can be seen, there are a greater number of exterior dimples 32 in the variation of FIG. 3, which may further decrease drag, increase lift and improve atomization. Preferably the dimples 34 are arranged in a pattern in the exterior surface of the casing so that each of six equal sectors of the casing show at least one dimple 32 thereon. Other dimple arrangements, such as are known in the golfing arts, may also be suitable. See, e.g., U.S. Pat. No. 4,560,168, issued to Aoyama, for a GOLF BALL, incorporated herein by reference.

Referring next to FIG. 4, a cross-sectional view is shown of an example of an exterior dimple 22, 32 of the above-described projectiles.

As can be seen, the dimple 22, 32 has frustoconical-shaped interior walls 40 and a flat innermost surface 42, or basal portion, with a depth of between about 1 mm and 3 mm, e.g., 2.0 mm, which is preferably about 75% of the thickness of the shell, at minimum. As mentioned above, the dimples 22, 32 can be produced using laser ablation techniques, by forming them into the shell using injection molding techniques, or using other known forming techniques.

FIG. 5 is a side-view of a projectile 44 made in accordance with a further variation of the projectile of FIG. 1 modified to include a matrix pattern of exterior global scoring 46 that serves the tripartite purposes of decreasing drag, increasing lift and facilitating atomization of the inhibiting substance upon impact with the living target.

The projectile 44 of FIG. 5 is similar in materials, dimensions and manufactured projectile 10 of FIG. 1, but employs the matrix pattern of exterior global scoring 46. The scoring provides a lattice of structural weak points at which a casing bursts upon impact with the target. As with the embodiment shown in FIG. 2, this results in a larger and finer cloud of inhibiting substance proximate to the target immediately following impact of the projectile 44 with the target, thus providing for more effective inhibiting of the target than had heretofore been possible with conventional projectile approaches. The scoring 46 is preferably "V"-shaped in cross-section with a flat bottom portion of the "V" providing a basel portion of such scoring. The scoring has a depth of from between about 1 mm and 3 mm, e.g. 2 mm and preferably has a minimum depth of about 75% of the thickness of the casing or shell 48. Preferably, there are from between about 2 and 10, e.g., 7, circumferential (i.e., latitudinal) scores and from between about 2 and 10, e.g., 7 longitudinal scores in the surface of the shell 48 so as to provide omnidirectional atomization of the inhibiting substance upon impact and a maximal decrease in drag and increase in lift for the projectile.

Referring next to FIG. 6, a cross-sectional view is shown of a projectile 50 for delivering an inhibiting substance to a living target in accordance with another embodiment of the present invention, wherein the projectile 10 of the embodiment of FIG. 1 is employed to carry the inhibiting substance, and a stabilizer body 52 is employed to increase range.

The projectile 50 of FIG. 6 employs the inhibiting substance encapsulated within the shell 12, such as described above. Alternatively, the shell may have a non-spherical shape, such as a bullet shape, e.g., elliptical, parabolical, prolate spheroidal, two-sheet hyperboloidal, or the like. The shell 12 is mounted to the stabilizer body 52, which has a stabilizer section 54, a puncture tube 56, and an atomization matrix 56. The shell 12 is mounted to the stabilizer body 52 on a forward edge 58 of the atomization matrix 56, and rests on a tip 60 of the puncture tube 56. Wax or adhesive may be used to hold the shell 12 in place.

Upon impacting with the target, the shell 12 is forced backwards (relative to the direction of flight of the projectile) into the tip 60 of the puncture tube 56, which punctures the shell 12. This releases the inhibiting substance contained within the shell 12 into an interior region 62 of the atomization matrix 56. From the interior region 62 of the atomization matrix 56, the inhibiting substance is released through a plurality of exit orifices 64 passing through the periphery of the atomization matrix. There are preferably from between 2 and 20, e.g., 10 exit orifices 64 in the atomization matrix 56. Each exit orifice 64 preferably has a circular shape and a diameter of from between about 0.5 mm and 4 mm, e.g., 1 mm.

The stabilizer body 52 is preferably circular in cross-section (taken normal to its direction of flight), having an outer diameter equal to the outer diameter of the shell 12, i.e., from between about 1.0 cm and 5.0 cm, e.g., 1.8 cm. The length of the stabilizer body 52 is from between about 1.5 cm and 5 cm, e.g., 3 cm, and the overall length of the projectile 50 (i.e., the stabilizer body and the shell) is from between about 2.5 cm and 10 cm, e.g., 5 cm. The stabilizer body 52 is preferably made from plastic or acrylonitrile butadiene styrene resin (ABS), and the stabilizer section 54 has a hollow rear section 66 that has a hollow interior with an inner diameter of from between 1.0 cm and 5 cm, e.g., 1.8 cm, and a depth of from between about 1 cm and 5 cm, e.g., 2 cm. The hollow rear section 66 serves to decrease the mass of the stabilizer body 52 without significant detrimental effect on the aerodynamics of the projectile 50. The stabilizer body 52 can be made using known plastics moulding techniques, such as injection moulding.

Referring next to FIG. 7, a cross-sectional view is shown of a projectile 70 made in accordance with one variation of the projectile 50 of FIG. 6, wherein a plunger 72, or impact piston, is employed to explode a shell 12 containing the inhibiting substance.

The projectile 70 has a stabilizer body 74, similar in function, dimensions and manufacture, to the stabilizer body 52 described above, and the impact piston 72 is slidable within a piston cylinder 76. The piston cylinder 76 is formed at a forward portion of an atomization matrix 78, similar to the atomization matrix 56 described above. The stabilizer body 74 also employs a stabilizer section 80, similar to the stabilizer section described above. The shell 12 is located between a pair of puncture tubes 82, 84, one of which forms a rearward portion of the impact piston 72, and one of which forms a forward portion of the stabilizer section 80. The shell 12 is located within the atomization matrix 78.

Upon impact with the target, the impact piston 72 is forced rearward by its impact against the target, squeezing the shell 12 between the puncture tubes 82, 84, ultimately causing the shell 12 to rupture. This releases the inhibiting substance within the shell 12 into an interior region 86 of the atomization matrix, from which the inhibiting substance escapes via exit orifices 88 similar to the exit orifices 64, described above.

Referring next to FIG. 8, a cross-sectional view is shown of a projectile 90 made in accordance with another variation of the projectile 50 of FIG. 6, wherein an impact piston 92 is employed to explode a shell 12 containing the inhibiting substance.

The projectile 90 of FIG. 8 is similar in structure and operation to the projectile 50 of FIG. 7 except as noted below. The projectile 90 of FIG. 8 employs the impact piston 92 having a bullet-shaped, e.g., elliptic paraboloid, prolate spheroid, two-sheet hyperboloid, or the like, forward end 94. Advantageously, this bullet-shaped forward end 94 provides improved aerodynamics for the projectile 90, thus facilitating firing over longer distances and/or using a lower-powered weapon than is needed to fire the projectiles of FIGS. 6 or 7.

FIG. 9 is a cross-sectional view of a projectile made in accordance with a further variation of the projectile 100, wherein a variation of the impact piston 109 is employed to explode the capsule 12 containing the inhibiting substance, and wherein the atomization matrix 104 is located at a rearward end of the projectile 100.

Shown are the shell 12 mounted to a stabilizer body 106 which has a puncture tube 108. An impact piston 109 is slidable within a piston cylinder 111 formed at a forward portion of the atomization matrix 104. The shell 12 is located between the impact piston 109 and the puncture tube 108. Advantageously, the atomization matrix 104 is located at a rearward section of the projectile and exit orifices 114 that make up the atomization matrix 104 are angled forward so as to direct inhibiting substance escaping therethrough toward the front of the projectile, i.e., toward the target. The impact piston 109 of the present embodiment preferably includes a rubber tip 116 aimed at minimizing damage to the target.

Upon impact with the target, the impact piston 109 is forced rearward by impact against the target, squeezing the shell 12 between the impact piston 109 and the puncture tube 108, ultimately causing the shell 12 to rupture. Such rupturing of the shell 12 releases the inhibiting substance within the shell 12 into an interior region 118 of the atomization matrix 104, from which the inhibiting substance escapes via the exit orifices 114 by which it is directed toward the target.

FIG. 10 is a cross-sectional view of a projectile 200 made in accordance with a variation of the projectile of FIG. 9, wherein the impact piston 110 is employed to puncture a membrane 202 behind which is contained the inhibiting substance 4. The membrane may be made from, for example, wax, plastic, acrylic or polyvinylchloride. In all other respects, the projectile 200 is substantially identical to the projectile 100 (FIG. 9), and therefore further explanation of its structure and functionality is not made herein.

Referring next to FIG. 11, a cross-sectional view is shown of a projectile 110 for delivering an inhibiting substance to a living target in accordance with a further embodiment of the present invention, wherein a pressurized canister 112 is employed to carry the inhibiting substance, and a stabilizer section 114 is employed to increase range.

Shown are a plurality of radially oriented exit orifices 116 emanating from a central release chamber 118 into which a valve 120 expels inhibiting substance upon being rearwardly displaced. Also shown are the stabilizer body 80 and a piston 92. The piston 92 is bullet-shaped, similar to the piston 92 shown in FIG. 7 above, with a puncture tube 82 located on a rearward portion thereof. The piston 92 is housed in a cylinder 122 that forms a forward portion of the stabilizer body 114. Alternatively, the pressurized canister 112 may be long enough to itself act also as the target piston 92, thus eliminating the need for a separate piston such as the piston 92. The stabilizer body 114 also includes a stabilizer section 80 similar to the stabilizer section 80 described above.

Upon impact, the piston 92 is displaced rearwardly within the cylinder 122, which forces the puncture tube 82 into the valve 120. In response to a force applied by the puncture tube 82, the valve 120 is rearwardly displaced. In response to such rearward displacement, the valve 120 releases the inhibiting substance into the central release chamber 118, from which the inhibiting substance escapes through the exit orifices 116, thereby dispersing the inhibiting substance proximate to the target. Preferably the exit orifices 116 are angled forward so as to better direct the inhibiting substance to the target.

The inhibiting substance is contained within the canister 112 which is formed in, or inserted into a portion 124 of the stabilizer body 114 in front of the stabilizer section. Within the canister 112, the inhibiting substance is pressurized so that it is readily expelled when the valve 120 is opened. The inhibiting substance may be pressurized using, e.g., compressed air techniques or aerosol techniques, such as are known in the art.

FIG. 12 is a cross-sectional view of the projectile 250 for delivering an inhibiting substance to a living target, wherein a pressurized canister 112 is employed to carry the inhibiting substance, and a stabilizer section 114 is employed to increase range, and wherein the projectile 250 employs an adhesive material 252 and a mechanical attachment system 254 to attach the projectile to the target during delivery of the inhibiting substance to the target.

Shown are a plurality of radially oriented exit orifices 116 emanating from a central release chamber 118 into which a valve 120 expels an inhibiting substance upon being rearwardly displaced. Also shown are the stabilizer body 80 and a piston 92. The piston 92 is bullet-shaped, similar to the piston shown in FIG. 11 above. The piston 92 is housed in a cylinder 122 that forms a forward portion of the stabilizer body 114. The stabilizer body 114 also includes a stabilizer section 80, which is similar to the stabilizer section 80 described above.

Upon impact the piston 92 is displaced rearwardly within the cylinder 122, which forces the pressurized canister 112 into the valve 120. In response to the force on the valve 120, the valve 120 is rearwardly displaced causing it to open and release the inhibiting substance into the central release chamber 118, from which the inhibiting substance escapes through the exit orifices 116, thereby dispersing the inhibiting substance proximate to the target.

Concomitantly with the rearwardly displacement of the piston 92, piston locks 256 lock the piston in its displaced position, which in turn locks the pressurized canister 112 in its displaced position, holding the valve 120 in an open state. The piston locks 256 may, for example, operate in a ratchet fashion.

The adhesive material 252 and mechanical attachment system 254, which may comprise a plurality of barbed tips 254, assure that once the projectile 250 impacts the target it will attach to the target during release of the inhibiting substance, so as to increase the effectivity of the inhibiting substance against the target. The adhesive material is preferably centrally located on a forward end of the piston 92, whereas the barbed tips 254 preferably are located peripherically around the forward end of the piston 92. (Note that in variations of the present embodiment either the adhesive material 252 or the mechanical attachment 254 may be used alone, instead of in combination with each other.)

FIG. 13 is a side cross-sectional view of a projectile 300 for delivering an inhibiting substance to a living target in accordance with an additional embodiment of the present invention, wherein a twelve-gauge shotgun shell 302 is packed with a rosin bag 304 that contains an inhibiting substance, such as Oleoresin Capsicum.

Shown are the twelve-gauge shotgun shell 302, the rosin bag 304, an airtight seal 306, wadding 308, and black powder 310.

Upon firing of the twelve-gauge shotgun shell 302, the black powder 310 is ignited, which causes the expansion of gases forcing the wadding 308 and the rosin bag 304 out of the twelve-gauge shotgun shell 302. Such forcing out of the wadding 308 and the rosin bag 304 breaks the airtight seal 306. The rosin bag 304, as mentioned above, contains Oleoresin Capsicum, in powder form, which upon impact with the target causes the target to be inhibited. (The rosin bag 304 is, as is known in the art, porous, so as to allow release of the powdered inhibiting substance upon impact of the rosin bag 304 with the target.)

Referring next to FIG. 14, an end cross-sectional view is shown of the projectile 300. Shown are the twelve-gauge shotgun shell 302 and the rosin bag 304. As can be seen, the rosin bag 304 is folded within the twelve-gauge shotgun shell 302 so as to fit tightly within the twelve-gauge shotgun shell 302. Upon firing of the twelve-gauge shotgun shell 302, the rosin bag 304 expands and unfolds prior to impact with the target so as to maximize exposure of the target to the rosin bag 304, thus maximizing its inhibiting effect.

Referring next to FIG. 15, a cross-sectional view is shown of a launch device 400 useable in combination with projectiles described herein for delivering an inhibiting substance to a living target. Advantageously, the launch device depicted is in the form of a PR24 police baton, such as those commonly used by law enforcement officers. Shown are a plurality of projectiles 402 loaded within a chamber 404 of the launch device. The chamber 404 also houses a spring 406, which is used to push the projectiles 402 into position for firing. A flapper valve 408 retains the projectiles 402, allowing only a single projectile 418 to move into a barrel 410 for firing. The chamber 404 and the barrel 410 together form the baton portion of the PR24 police baton.

Within a handle portion of such baton, a valve switch 412 and a propellent cylinder 414 are housed. A removable cap 416 on an end of the handle portion can be used to load the propellant cylinder 414 into the device 400. When launch of a projectile is desired, the valve 412 is opened by operation of a button or trigger (not shown) which releases a measured amount of propellent from the propellent cylinder 414 into the barrel 410 behind the single projectile 418. This propellent is preferably $CO_2$ or compressed air and propels the single projectile 418 down the barrel and out the end of the launch device toward a target. When reloading of the device is desired, another removable cap 420 is removed, along with the spring 406, and a plurality of projectiles are loaded into the chamber 402 behind the flapper valve 408.

Referring next to FIG. 16, a cross-sectional view is shown of a launch device 450 useable with projectiles described above for delivering an inhibiting substance in accordance with another embodiment of the present invention. Advantageously the launch device 450 assumes the form of a flashlight, including batteries 452, an on/off switch 454 and a reflector housing 456 of conventional design. Also shown are a propellent cylinder 458, a valve switch 460, a projectile 462, a barrel 464 and a removable cap 466.

When firing of the projectile 462 is desired, the removal cap 466, which may be attached on one side, such as by a hinge, is opened, the device 450 is aimed at the target and the valve switch 460 is opened by the depression of a button or trigger (not shown). The opening of the valve switch 460 releases propellent gas from the propellent cylinder 458 into the barrel 464 behind the projectile 462, thus propelling the projectile 462 down the barrel 464 toward the target whereat it delivers the inhibiting substance to the target.

Referring next to FIG. 17, a cross-sectional view is shown of an adaptation of the launch device 500 of FIG. 14 for delivering ball-type projectiles in rapid successive firings. Shown is the spring 502, the projectile chamber 504, the valve 506, the propellent cylinder 508, the barrel 510, the flapper valve 512, the projectile in position for launch 514, the removable cap 516 and the other removable cap 518. Operation of the launch device 500 depicted in FIG. 17 is substantially identical to operation of the launch device 400 depicted in FIG. 15 and therefore further explanation of the functionality and structure depicted is not made herein.

Referring next to FIG. 18, a cross-sectional view is shown of an adaptation of a launch device 550 for delivering ball-type projectiles, wherein a plurality of barrels 566, 568 are employed to allow the simultaneous or rapid successive firing of projectiles 562, 565 without reloading. Shown are the batteries 552, the on/off switch 554, the reflector housing 556, the propellent cylinder 558, the valve switch 560 and the removable cover 566. The propellant cartridge 558, the valve switch 560, the removable cover 556, the projectiles 562, 564 and the barrels 556, 568 are housed within enlarged portion 570 of the launch device 550 so as to accommodate the two barrels 566, 568 within the circumference of the launch device 550. Except as noted herein above, the structure and operation of the launch device depicted in FIG. 18 is substantially identical to the structure and function of the launch device depicted in FIG. 16, and therefore further explanation of the launch device of FIG. 18 is not made herein except to note the valve switch 560 is preferably selective, such that the firing of a projectile from only one of the barrels 566, 568 at a time occurs. For example, a first depression of a button, may cause the valve switch 560 to direct a measured amount of propellant gas into one of the barrels 566, and a second depression of the button may cause the valve switch 560 to direct the measured amount of propellant gas into the other of the barrels 568. Other embodiments may allow simultaneous firing of projectiles from both barrels 566, 568 or manual selection of from which barrel 566, 568 to fire, and therefore selection of which projectile to fire. This latter embodiment may be useful, for example when two different projectiles carrying two different inhibiting substances are utilized.

Referring next to FIG. 19, an end view is shown of the launch device 550 described in FIG. 18, wherein two or more barrels 566, 568 allow multiple, simultaneous or rapid successive projectile launches.

What is claimed is:

1. A spherical projectile comprising:
    a powdered inhibiting substance; and
    a sealed spherical capsule for containing and delivering the powdered substance to a target, the sealed capsule having a thickness and including:
        a plurality of structurally weakening dimples in an exterior surface of the projectile, wherein the structurally weakening dimples have a minimum depth of about 75% of the thickness of the sealed capsule and wherein, upon impact of the projectile with the target, the sealed capsule bursts and the powdered substance contained therein disperses proximate to the target.

2. The projectile of claim 1 wherein at least a portion of the plurality of structurally weakening dimples comprise a structurally weakening basal portion.

3. The projectile of claim 1 wherein said powdered inhibiting substance is Oleoresin Capsicum.

4. The projectile of claim 1 wherein said sealed capsule comprises a material selected from the group consisting of plastic and gelatin.

5. The projectile of claim 1 wherein said sealed capsule comprises a material selected from the group consisting of sodium alginate, calcium chloride, coated alginate and polyvinyl alginate.

6. The projectile of claim 1 wherein said powdered inhibiting substance includes powdered pepper spray.

7. The projectile of claim 1 wherein said powdered inhibiting substance includes tear gas.

8. The projectile of claim 1 wherein said plurality of structurally weakening dimples includes at least 6 dimples wherein at least one of said plurality of dimples is positioned in each of six equal sectors of the sealed capsule.

9. The projectile of claim 8 wherein each said plurality of structurally weakening dimples includes a circular exterior edge.

10. The projectile of claim 9 wherein each of said plurality of dimples includes frustoconical-shaped walls and a basal portion.

11. The projectile of claim 10 wherein each of said basal portions are circular in shape.

* * * * *